Jan. 5, 1954   C. Z. MONROE ET AL   2,665,044
MACHINE FOR PACKAGING FLUENT MATERIAL
Filed March 30, 1948   16 Sheets-Sheet 3

INVENTOR
Charles Z. Monroe
Dwight German
Carlson, Pitzner, Hubbard & Wolfe
ATTORNEY

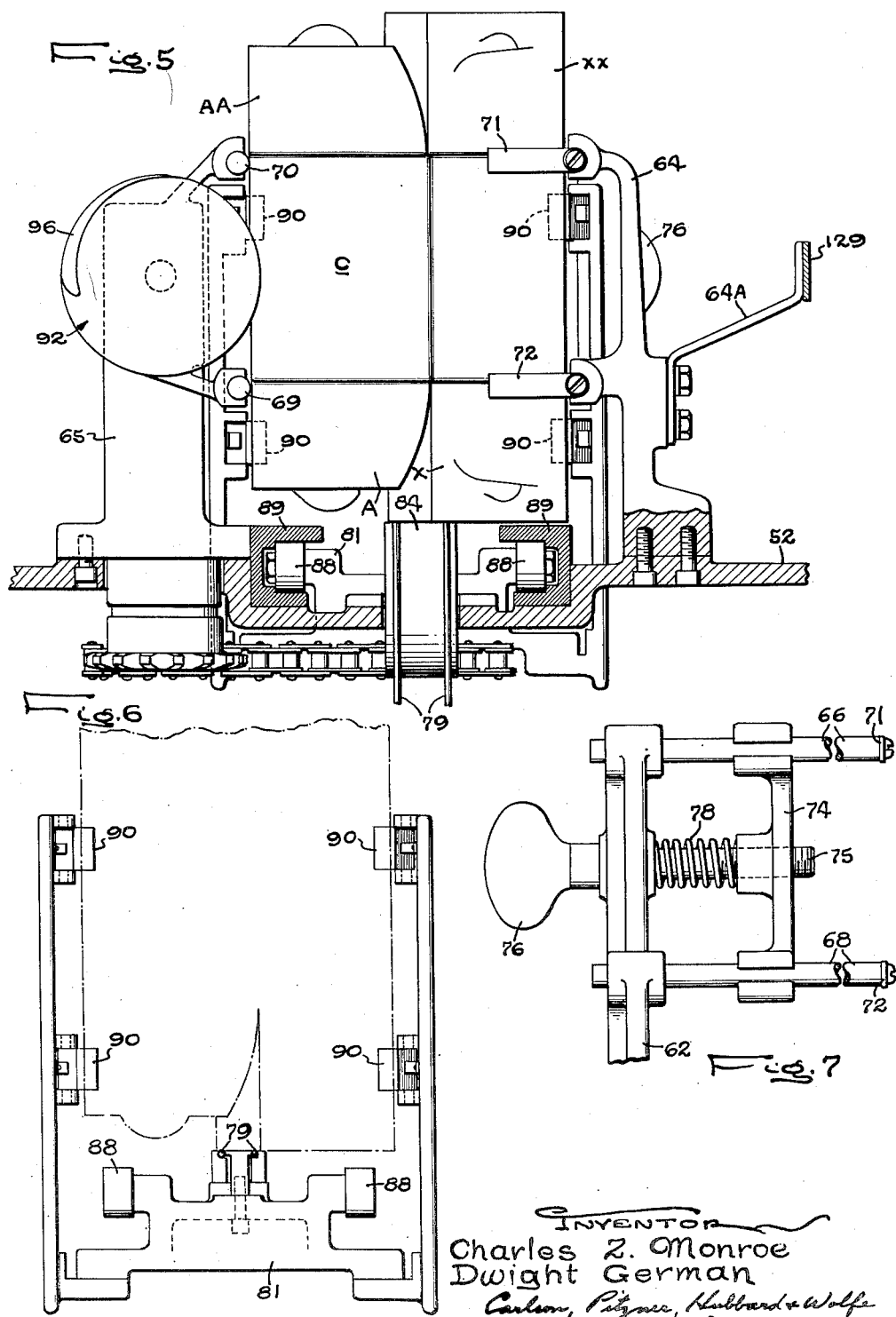

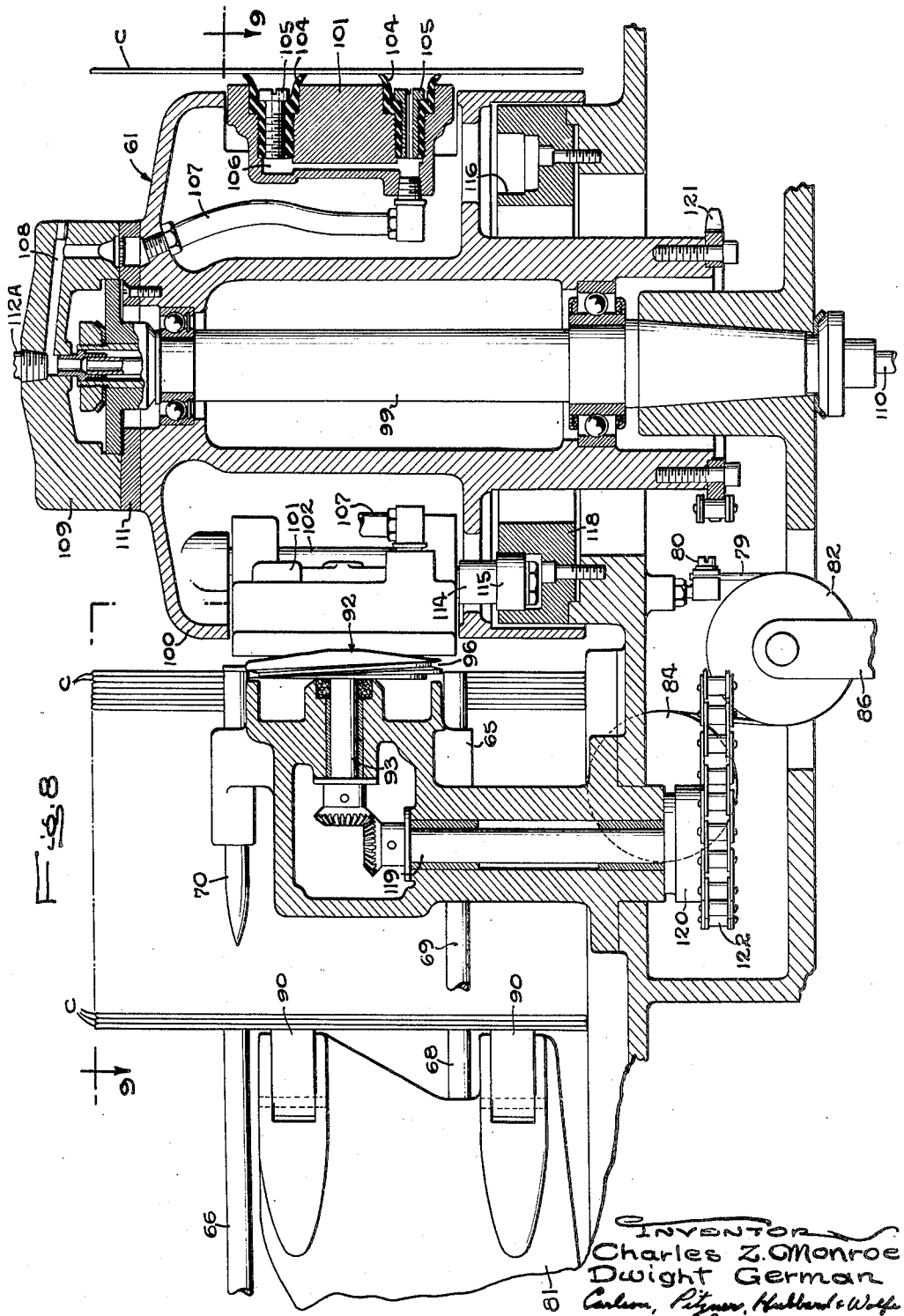

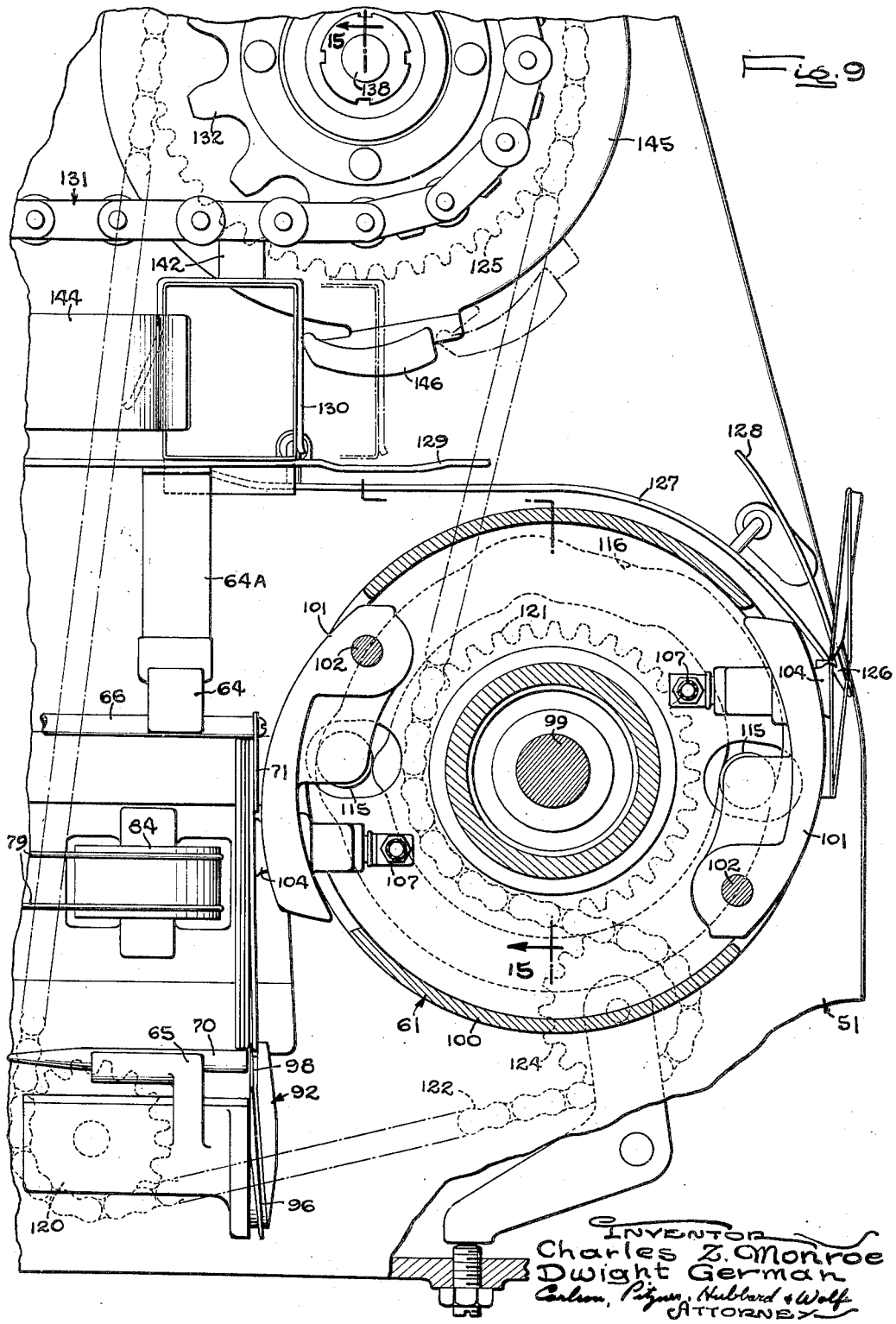

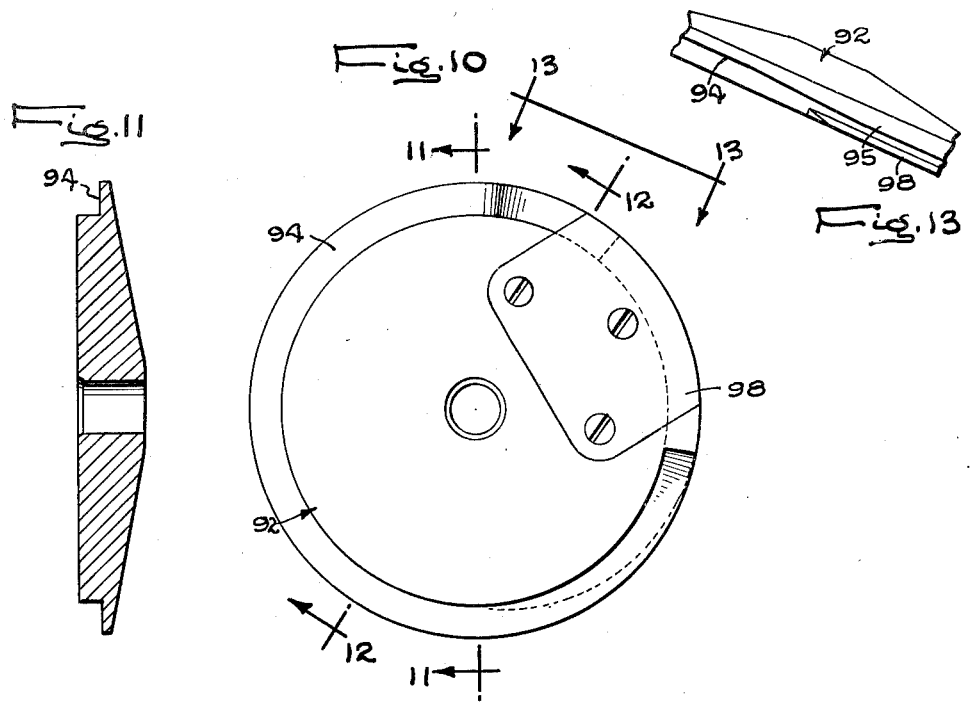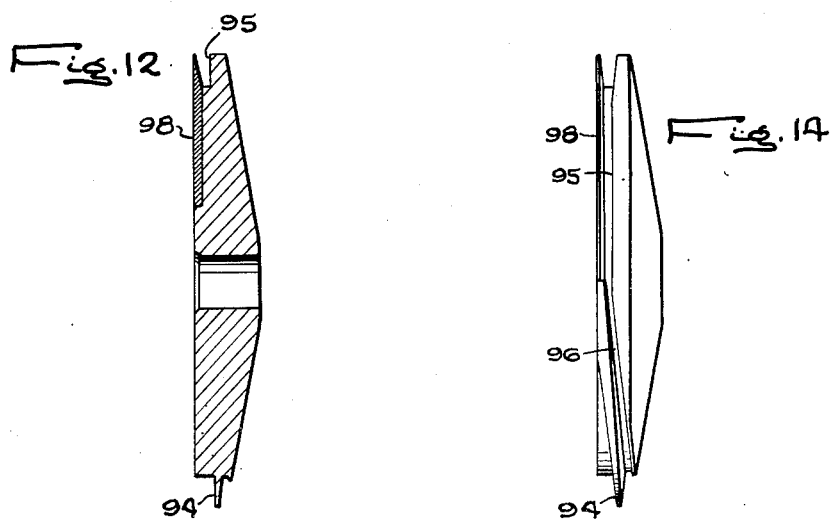

Jan. 5, 1954  C. Z. MONROE ET AL  2,665,044
MACHINE FOR PACKAGING FLUENT MATERIAL
Filed March 30, 1948  16 Sheets-Sheet 8
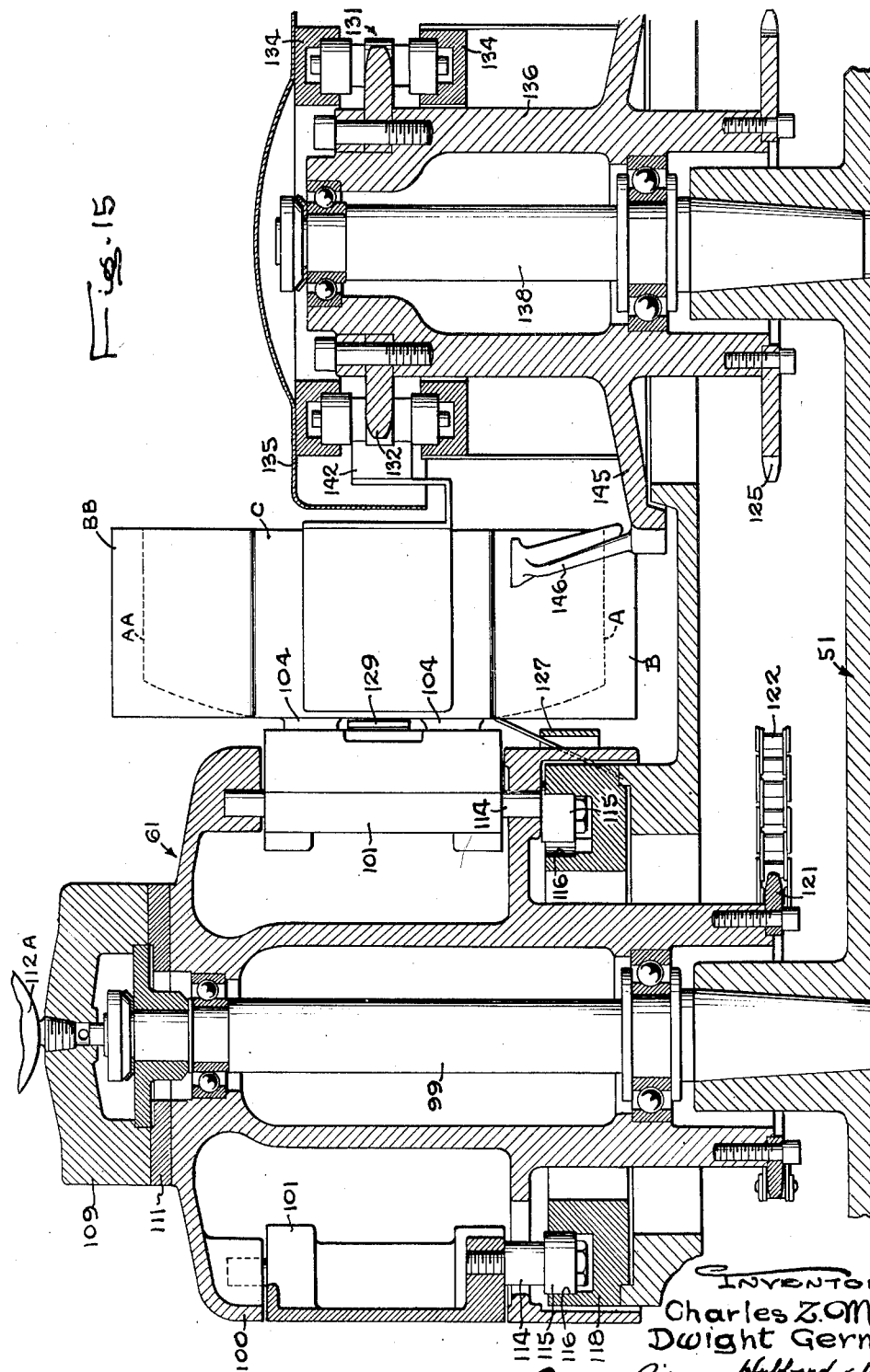
INVENTOR
Charles Z. Monroe
Dwight German
Carlson, Pitzner, Hubbard & Wolfe
ATTORNEYS Jan. 5, 1954   C. Z. MONROE ET AL   2,665,044
MACHINE FOR PACKAGING FLUENT MATERIAL
Filed March 30, 1948   16 Sheets-Sheet 9
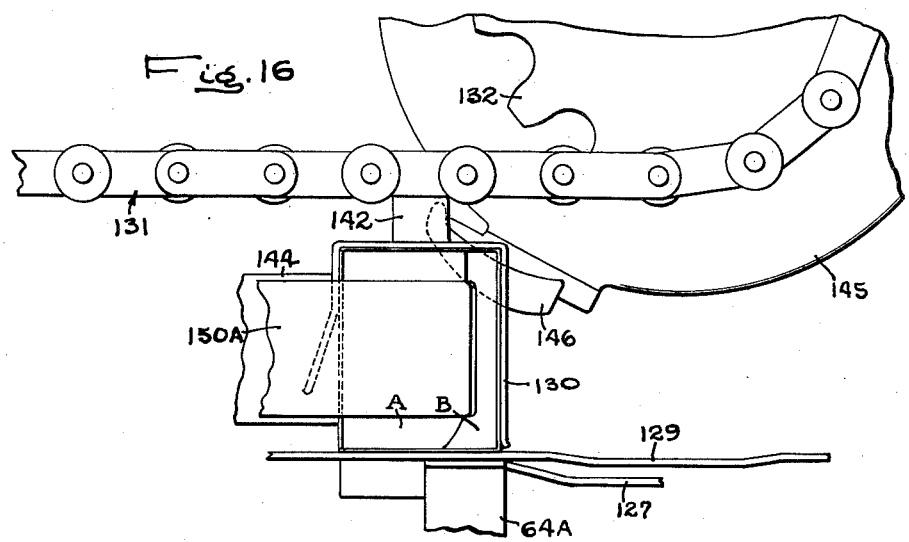
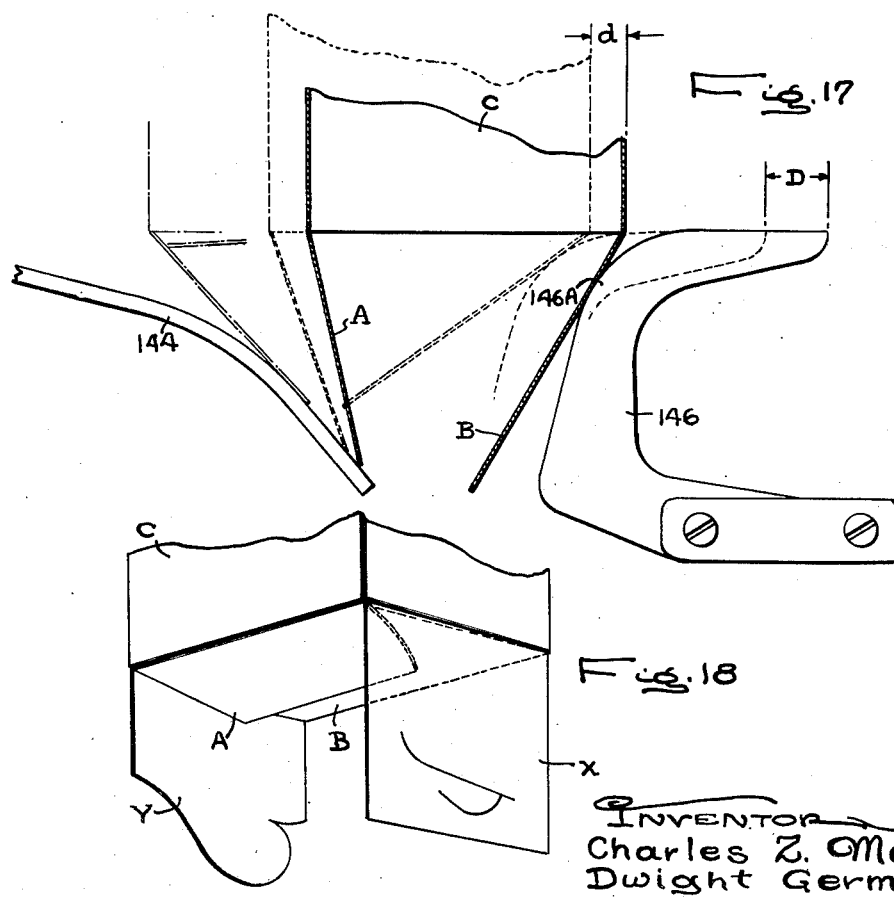
INVENTOR
Charles Z. Monroe
Dwight German
Carlson, Pitzner, Hubbard & Wolfe
ATTORNEY

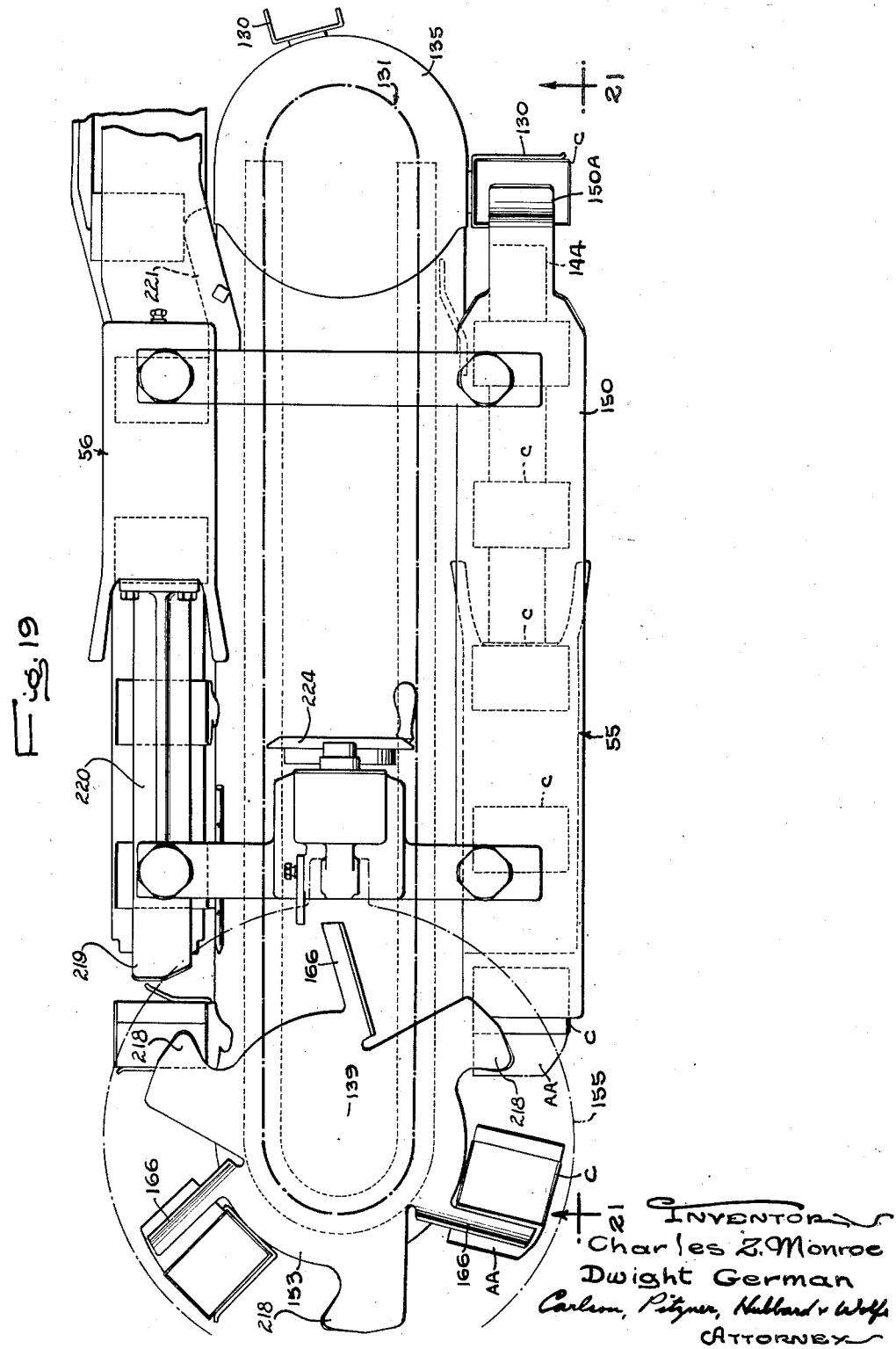

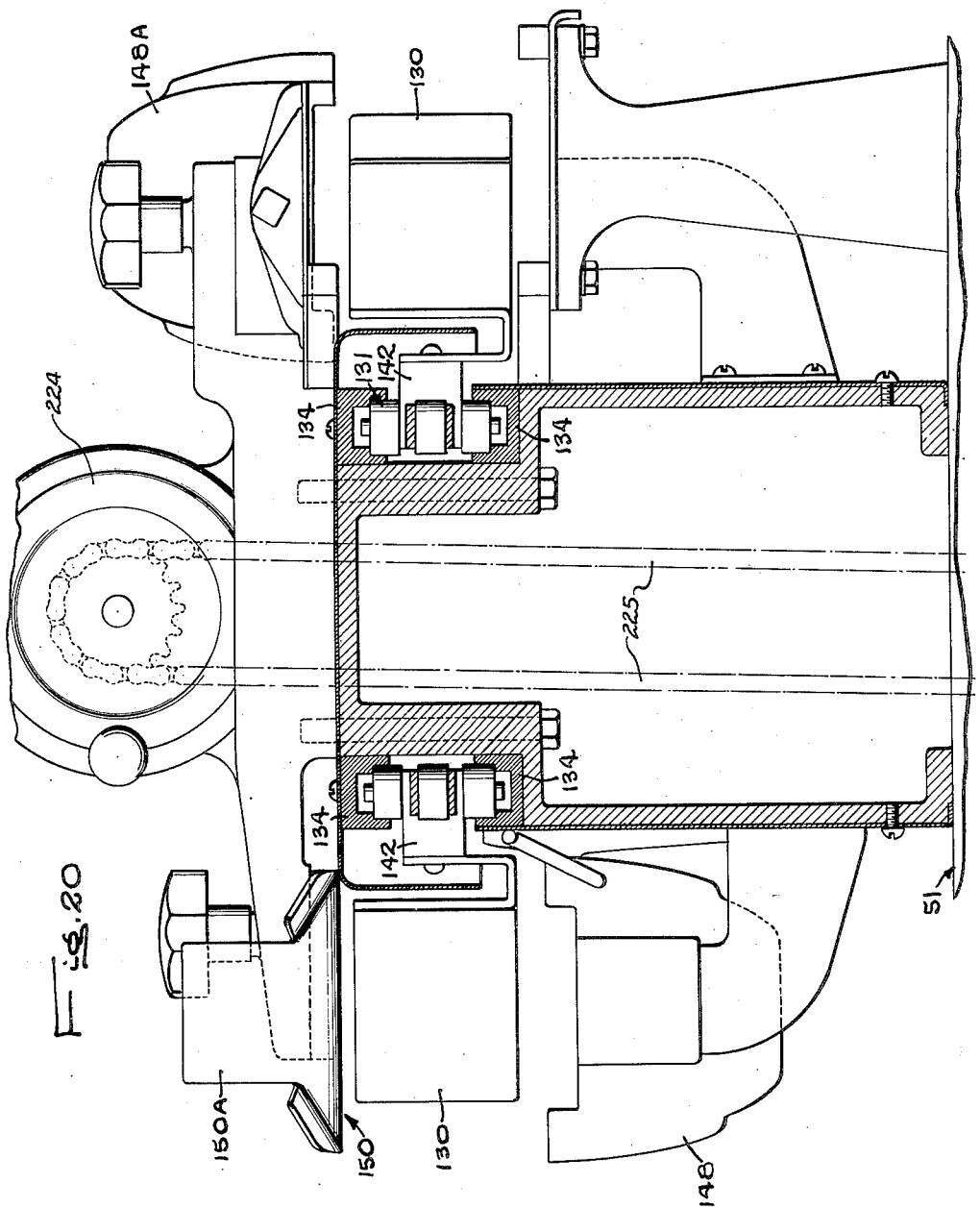

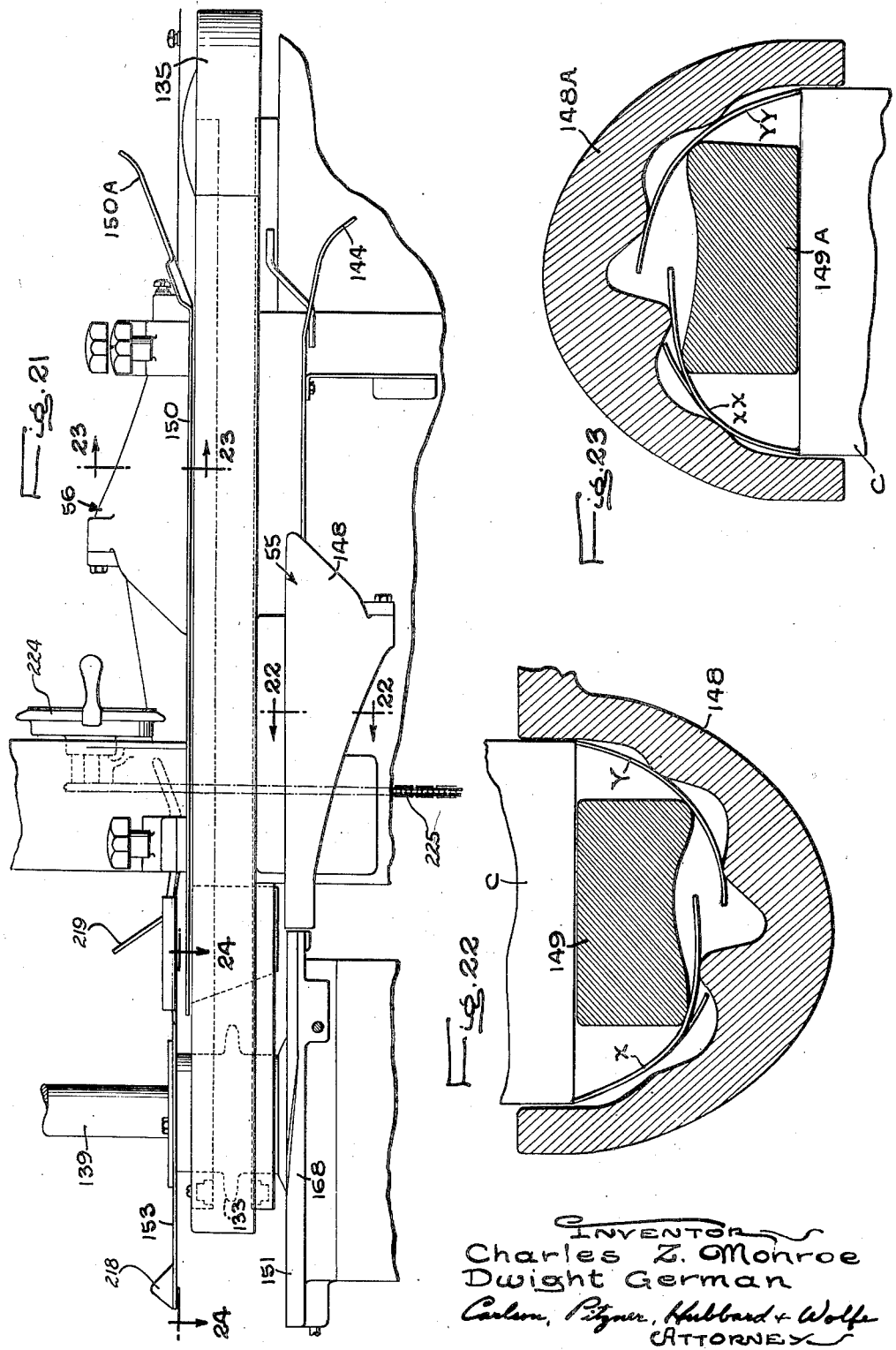

Jan. 5, 1954 C. Z. MONROE ET AL 2,665,044
MACHINE FOR PACKAGING FLUENT MATERIAL
Filed March 30, 1948 16 Sheets-Sheet 13
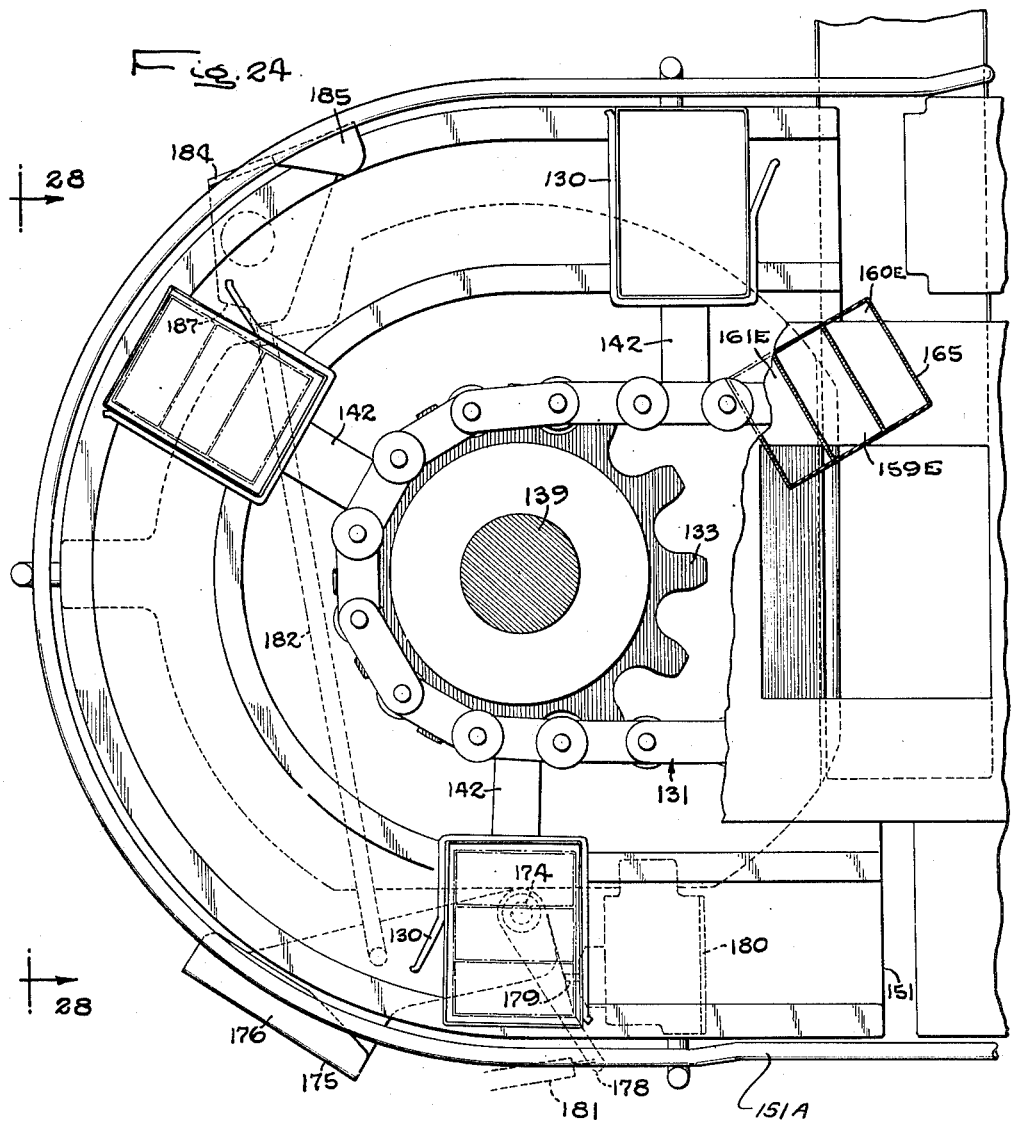
INVENTOR
Charles Z. Monroe
Dwight German
Carlson, Pitzner, Hubbard & Wolfe
ATTORNEY

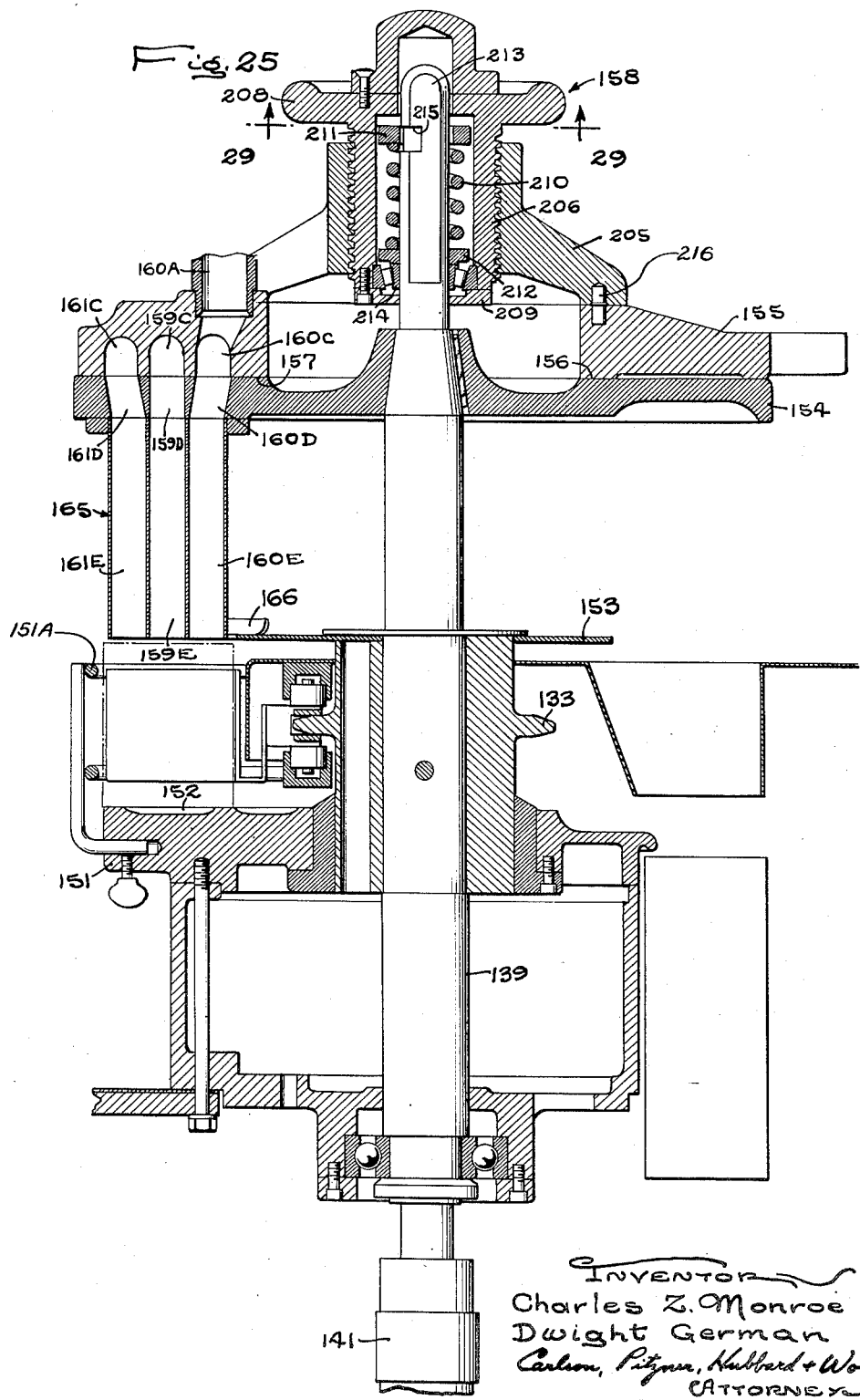

Jan. 5, 1954 C. Z. MONROE ET AL 2,665,044
MACHINE FOR PACKAGING FLUENT MATERIAL
Filed March 30, 1948 16 Sheets-Sheet 15

INVENTOR
Charles Z. Monroe
Dwight German
Carlson, Pigner, Hubbard & Wolfe
ATTORNEYS Jan. 5, 1954  C. Z. MONROE ET AL  2,665,044
MACHINE FOR PACKAGING FLUENT MATERIAL
Filed March 30, 1948  16 Sheets-Sheet 16
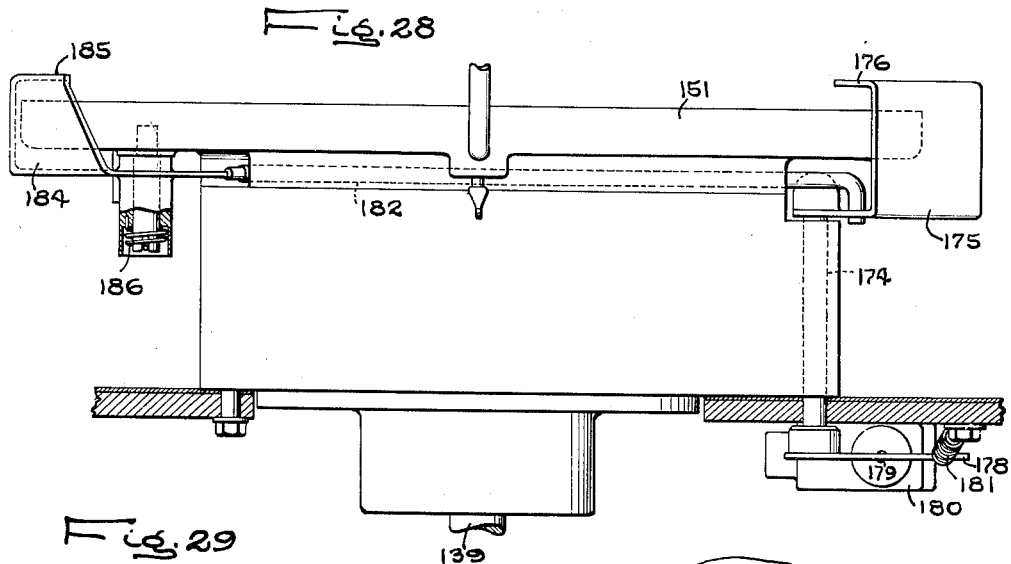
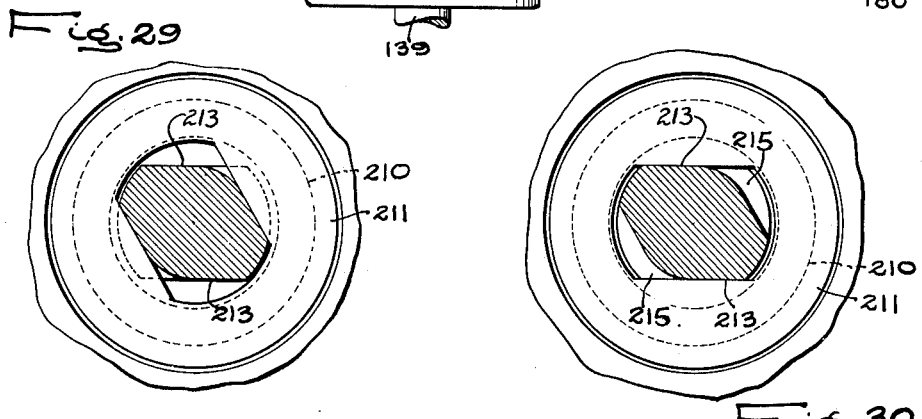
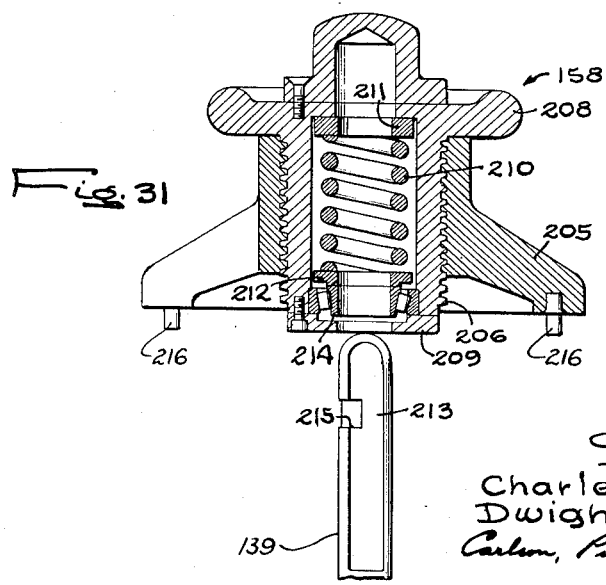
INVENTOR
Charles Z. Monroe
Dwight German
Carlson, Pitzner, Hubbard & Wolfe
ATTORNEY Patented Jan. 5, 1954

2,665,044

UNITED STATES PATENT OFFICE 2,665,044

MACHINE FOR PACKAGING FLUENT MATERIAL

Charles Z. Monroe and Dwight German, Detroit, Mich., assignors to Ex-Cell-O Corporation, Detroit, Mich., a corporation of Michigan Application March 30, 1948, Serial No. 18,034

6 Claims. (Cl. 226—19)

The present invention relates generally to the packaging of fluent materials delivered at a substantially continuous rate from batching or processing apparatus. More specifically, the invention pertains to a novel and improved machine for handling and packaging material of the foregoing type such as semi-liquid ice cream discharged in a steady stream from one or more so-called continuous freezers.

Certain aspects of the disclosure of the present application are dealt with in our copending divisional applications, Serial No. 255,074 filed November 6, 1951, and entitled "Feeding and Erecting Mechanism for Carton Blanks"; Serial No. 368,134 filed July 15, 1953, and entitled "Magazine for Feeding Flat Carton Blanks"; and Serial No. 368,136 filed July 15, 1953, and entitled "Closure Flap Manipulating Mechanism for Carton Filling Machine."

The flow from a continuous freezer of the type contemplated is somewhat peculiar in that it must not be subjected to back pressure. The reason for this is that the application of back pressure will very quickly cause the unit to freeze up solid. As a consequence, this factor must be given ample consideration in the planning of packaging machinery adapted to receive the output of a continuous freezer.

One of the objects of the invention is to provide an ice cream packaging machine capable of handling without interruption the flow of semi-fluent ice cream discharged by one or more continuous freezers. A related object is to provide a machine of the character set forth having automatic diversion means to compensate for certain unusual operating conditions without interrupting the flow from the freezer.

Another object is to provide a machine of the above type having a novel continuous filling arrangement for producing a metered discharge into each one of a procession of cartons passing through the machine.

A further object is to provide a machine of the character set forth and having means accommodating the same for operation at various freezer discharge rates.

Still another object is to provide a machine of the above type having an improved means for holding a stack of carton blanks and for positively separating one blank at a time from such stack regardless of any warpage in the blank. A related object is to provide a blank holding means whereby additional blanks can be added from time to time without interfering in any way with the operation of the machine.

Another object is to provide a machine of the foregoing character having a novel arrangement for erecting a knocked-down carton blank and for closing the inner pair of flaps at both the bottom and the top of a carton.

Further objects and advantages of the invention will become apparent as the following description proceeds, taken in connection with the accompanying drawings, in which:

Fig. 5 is an enlarged fragmentary sectional view of the feeder mechanism taken in the plane of the line 5—5 in Fig. 1.

Fig. 6 is an end view of the pusher carriage shown in Fig. 5, the relative position of the carton stack being indicated in dot-dash outline.

Fig. 7 is an enlarged fragmentary sectional view detailing the adjusting means associated with the feeder magazine, such view being taken in the plane of the line 7—7 in Fig. 2.

Fig. 8 is an enlarged broken vertical sectional view taken through the separating means and the transfer turret and in the plane of the line 8—8 in Fig. 2.

Fig. 9 is an enlarged horizontal sectional view taken in the plane of the line 9—9 in Fig. 8.

Figs. 10 to 14, inclusive, are various elevations and sectional views detailing the peeler wheel which separates carton blanks from the stack in the magazine.

Fig. 15 is a fragmentary vertical sectional view through the transfer turret and the carrier idler spool, taken in the plane of the line 15—15 in Fig. 9.

Fig. 16 is a fragmentary plan view of a portion of the conveyor chain including one of the conveyor receptacles.

Fig. 17 is an enlarged fragmentary view showing a portion of a carton in section and the inner bottom flap closure means in elevation.

Fig. 18 is a fragmentary perspective view of the bottom portion of a carton and showing the two inner flaps in a substantially closed condition.

Fig. 19 is an enlarged, fragmentary plan view illustrating the conveyor circuit of the machine and taken with a portion of the filling apparatus removed.

Figure 2:
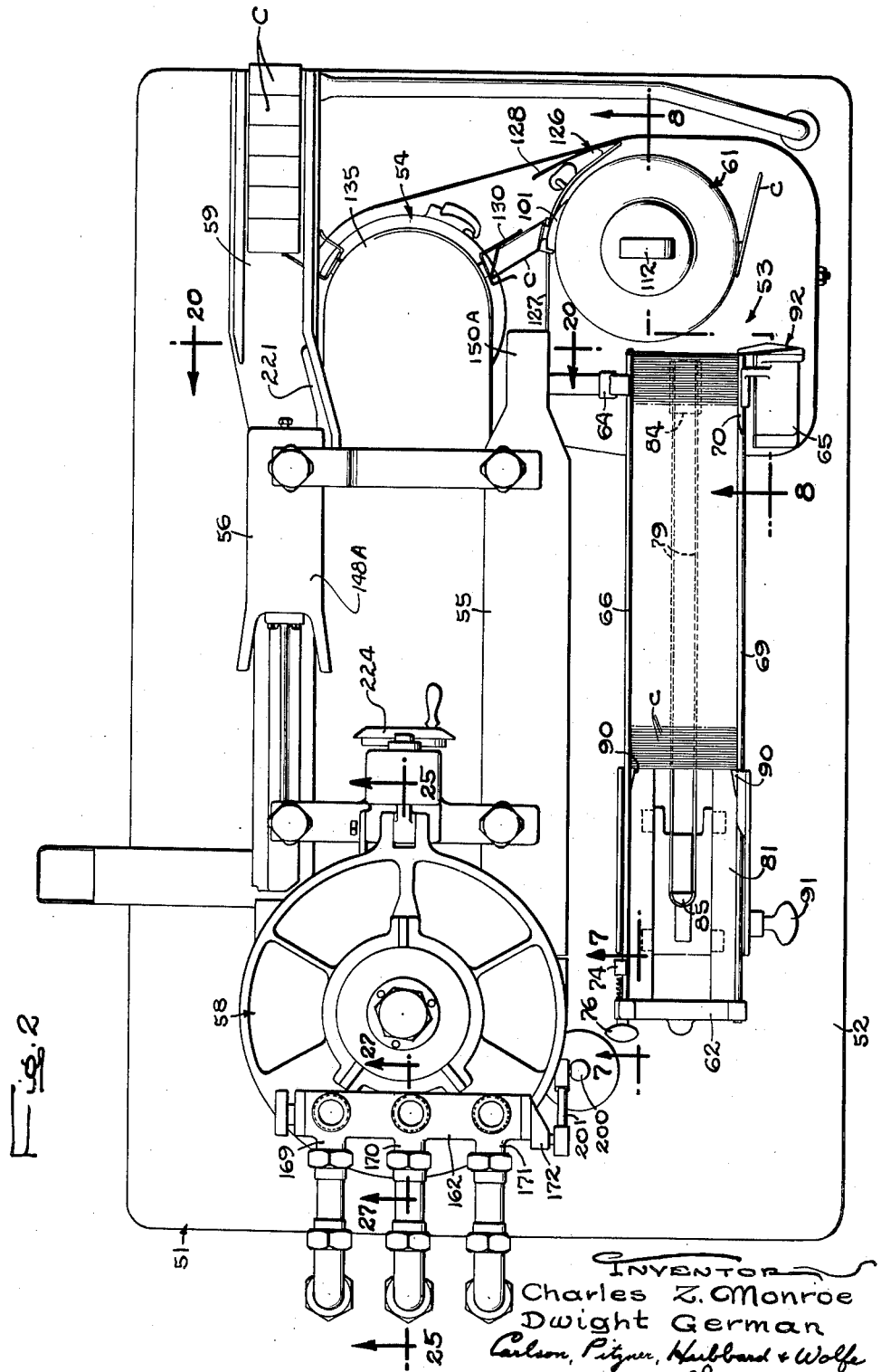
Fig. 2 is a plan view of the machine of Fig. 1 showing the layout of the various carton handling mechanisms and also illustrating the filler head assembly in plan.

Fig. 20 is an enlarged vertical sectional view taken in the plane of the line 20—20 of Fig. 2.

Fig. 21 is a side elevation of the conveyor and certain of the flap closure devices as viewed from the plane of the line 21—21 of Fig. 19.

Figs. 22 and 23 are enlarged transverse vertical sectional views through the outer carton flap closure devices, taken respectively in the planes of the lines 22—22 and 23—23 of Fig. 21.

Fig. 24 is an enlarged fragmentary horizontal sectional view taken through the filler head end of the conveyor and in the plane of the line 24—24 in Fig. 21.

Fig. 25 is an enlarged fragmentary vertical sectional view through the filler head assembly, taken in the plane of the line 25—25 in Fig. 2.

Figure 1:
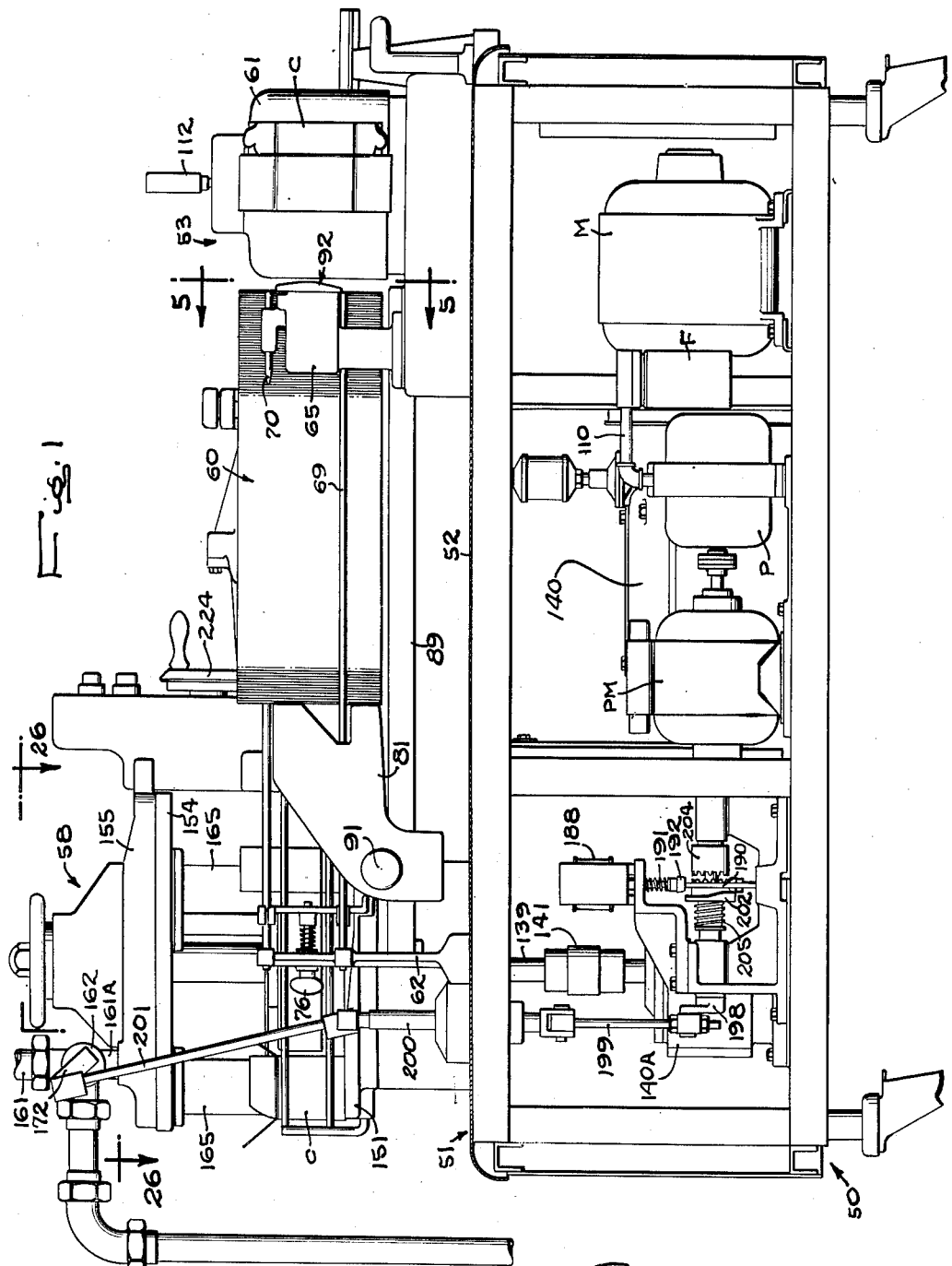
Figure 1 is a side elevation of a packaging machine embodying the invention and showing the relative locations of the driving machinery and various other major sub-assemblies.
Figure 26:
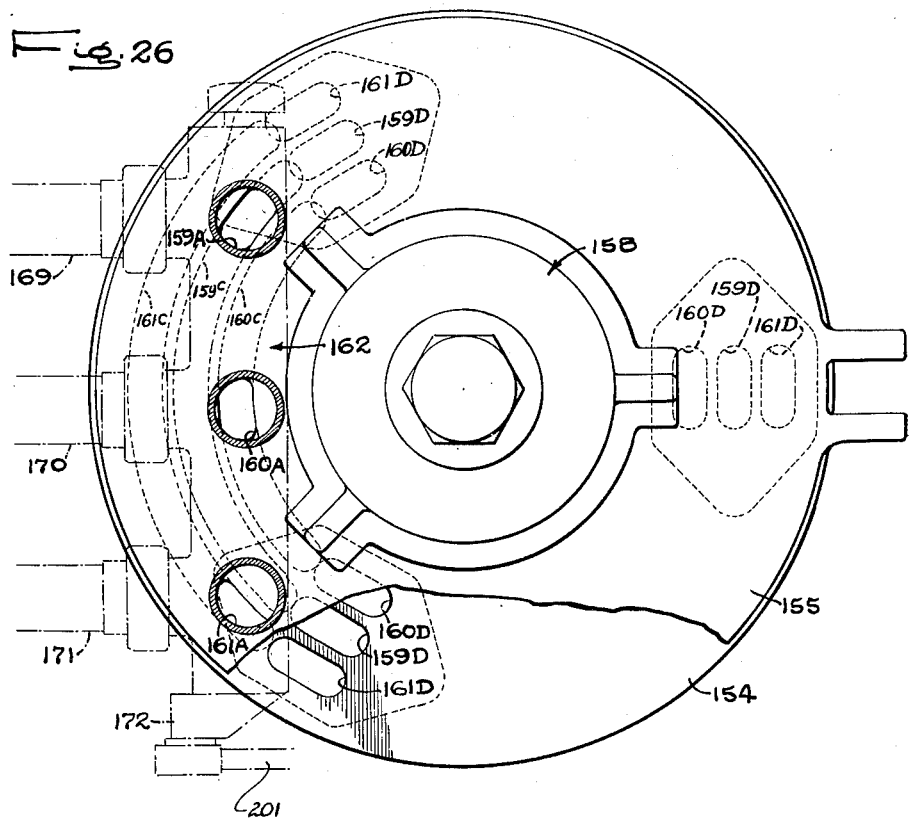

Fig. 26 is an enlarged broken horizontal sectional view taken in the plane of the line 26—26 in Fig. 1 and showing the relative locations of the openings in the radial valve faces of the filler head assembly.

Figure 27:
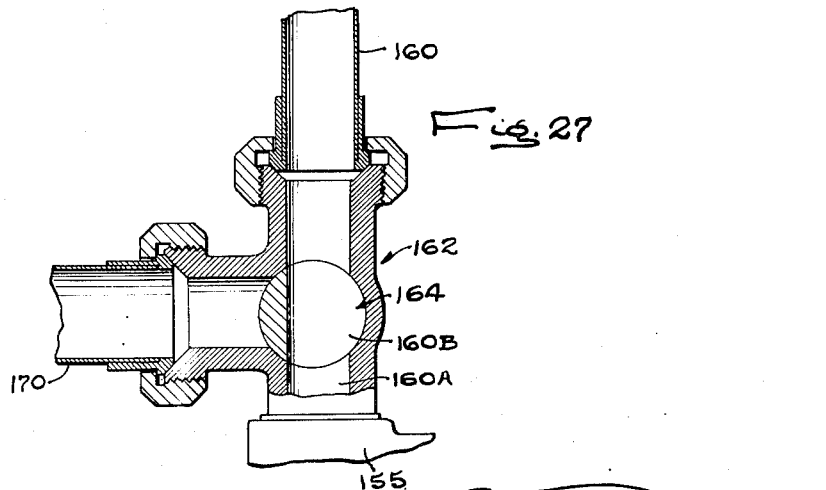

Fig. 27 is an enlarged fragmentary sectional view taken vertically through the valve manifold and in the plane of the line 27—27 in Fig. 2.

Fig. 28 is a fragmentary end view of the vacant receptacle detector mechanism illustrated in plan in Fig. 24.

Figs. 29 and 30 are horizontal sectional views taken through the valve face pressure adjusting device and in the plane of the line 29—29 in Fig. 25.

Fig. 31 is a vertical sectional view through the device of Figs. 29 and 30 and with such device removed from the filler head assembly drive shaft.

General

While the invention is susceptible of various modifications and alternative constructions, a preferred embodiment has been shown in the drawings and will be herein described in some detail, but it is to be understood that there is no intention to limit the invention to the specific form disclosed, the intention being, on the contrary, to cover all modifications and alternative constructions falling within the spirit and scope of the invention as expressed in the appended claims.

Referring more specifically to the drawings, the invention is there exemplified in a packaging machine 50 adapted in this instance to receive ice cream in semifluent form from a continuous freezer and to pack the same into paper cartons for retail distribution. The machine 50 is organized upon a caster-supported frame structure or table 51 having an enclosure which houses a main driving motor M and a pump driving motor PM, together with associated power transmitting mechanisms. The top 52 of the table 51 supports a carton feeding and transfer mechanism 53 which is adapted to present folded or knocked-down carton blanks C to an appropriate conveyor 54, the blanks being erected as an incident to such transfer. Operatively associated with the conveyor 54 and also mounted on the table top 52 are suitable carton flap closing devices 55 and 56 together with a carton filler head assembly 58. All of the carton handling devices just mentioned are driven in timed relation from the motor M through suitable gearing. With the foregoing arrangement each erected carton blank is moved into engagement with bottom flap closure means including a latching device 55, thence passing under the filler head assembly 58 where it receives a measured quantity of ice cream. The filled carton is thereupon moved into engagement with the top flap closure means including a second latching device 56 from which it is transferred to a discharge chute 59. In actual operation, the machine 50 fills cartons with remarkable speed and discharges them in a constant procession at a rate which is proportional to the discharge rate of the continuous freezer with which the machine is associated.

Feeding and transfer mechanism

This mechanism, designated above by the numeral 53, comprises a feeder rack or magazine 60, including appropriate carton separating means, together with a rotary transfer turret 61 (Figs. 1 and 2).

Considering first the magazine 60 per se, it will be noted upon reference to Figs. 1, 2 and 5 that such magazine comprises an upstanding yoke-shaped bracket 62 supported upon the table top 52 in spaced apart relationship with a pair of brackets 64, 65 also fixed to the table top. Spanning the brackets 62 and 64, and relatively slidable with respect thereto, are a pair of vertically spaced guide rods 66, 68. Spanning the brackets 62 and 65, but rigidly fixed thereto, is another guide rod 69. In addition to the latter, the bracket 65 also carries a relatively short guide rod 70 disposed in vertically spaced relationship with the rod 69. The purpose of the rods 66, 68, 69 and 70 is merely to maintain the vertical edges of the folded carton blanks C in close alinement to facilitate feeding them to the transfer turret 61.

For the purpose of positioning the foremost carton blank in the stack, the guide rods 66 and 68 are provided with a pair of stop lugs 71, 72 (Figs. 5 and 7) screwed or otherwise rigidly fastened to the ends of the rods adjacent the transfer turret 61. In order to render the carton stack adjustable relative to the turret 61, the position of the stop lugs 71 and 72 with respect to the brackets 62 and 64 can be altered by means of an adjusting bracket 74 which is pinned or otherwise secured to the rods 66 and 68. The bracket 74, in turn, can be positioned relative to the bracket 62 by means of a suitably threaded adjusting stud 75 having a hand knob 76 unitary therewith. Any lost motion between the stud 75 and the bracket 74 is taken up by means of a coil compression spring 78 interposed between the brackets 62 and 74.

Provision is made for supporting the weight of the carton blanks stacked in the magazine 60 upon a member which has no motion relative to the blanks as the latter are fed from the magazine. This is accomplished in the present instance by the use of a flexible cable 79 anchored to the table top 51 as at 80 (Fig. 8) and running longitudinally under the magazine 60 to a reciprocable pusher carriage 81. As indicated in the drawings, the cable 79 is arranged as an elongated loop running from the anchorage 80 around a floating pulley 82 and thence to a guide pulley 84 and finally around a semi-circular anchor post 85 mounted on the pusher carriage 81. To obtain sufficient tension in the cable 79 so as to offset the weight of the cartons in the magazine, a relatively heavy weight (not shown)

is suspended from the floating pulley 82 by means of a yoke 86 (Fig. 8).

The pusher carriage 81, which is adapted to maintain the stack of carton blanks in compression against the stop lugs 71, 72 and the separating means, comprises a generally U-shaped member equipped with supporting rollers 88 adapted to run in a pair of spaced apart parallel guide rails 89 (Figs. 5 and 6). The tension in the cable 79 urges the pusher carriage 81 toward the transfer turret 61 and, as the blanks are fed from the magazine, such tension maintains the carriage in constant abutment with the lattermost carton blank in the stack.

Provision is made for adding to the supply of carton blanks in the magazine 60 without disturbing the operation of the machine in any way. This is achieved in the present instance by equipping the carriage 81 with a plurality of pivotally mounted pusher fingers 90. These fingers are normally urged inwardly of the carriage by means of suitable biasing springs and their pivot points are so located that they will engage the stack of blanks when the carriage moves in one direction only. Thus, if it be desired to add carton blanks to the stack in the magazine, it is only necessary for the operator to place the additional blanks inside the pusher carriage 81 and to hold them fast against the lattermost blank in the magazine. At the same time, if the pusher carriage be moved manually away from the turret 61 by means of a handle 91, the fingers 90 will simply cam over the vertical edges of the additional blanks and upon release of the pusher carriage will then spring inwardly and engage the lattermost additional carton blank which then becomes the lattermost blank in the magazine.

For the purpose of effecting a positive separation between the foremost carton blank and the remaining blanks in the magazine 60, means is provided in the form of a peeler wheel 92 (Figs. 6, 8 and 9) drivingly carried upon a shaft 93 which is journaled in the bracket 65 for rotation on an axis substantially parallel to that of the magazine 60. The peeler wheel 92 in this instance (Figs. 10 to 14) is fashioned with a radial shoulder 94 which runs for an angular distance in the neighborhood of 270 degrees. The shoulder 94 is, of course, adapted to contact the adjacent marginal edge portion of the foremost carton in the stack without imparting motion to the carton blank. During the remaining 90 degrees of peripheral distance, the shoulder 94 gives way to an axial cam portion 95 having an initial cam slope which terminates in a radial face substantially parallel to the face 94. The cam portion 95 then gives way to a relatively deep single helical thread 96 which cuts completely across the outer periphery of the wheel 92. Adjacent the area where the cam portion 95 flattens out, there is provided a knife blade 98. The latter is spaced axially from the radial face of the cam portion 95 a distance approximately equal to the thickness of one folded carton blank (Figs. 9, 13 and 14). In operation, the peeler wheel will initially rotate with its face 94 in contact with the foremost carton without applying motion to the latter. Upon further rotation of the wheel 92, the cam portion 95 will exert a positive thrust against the marginal edge portion of the foremost carton, compressing the same against the remaining carton blanks in the magazine. While the marginal edge portion of the foremost carton is thus compressed, the separator knife 98 will wedge between such portion and the next blank in the magazine. Upon still further rotation of the wheel 92, the separated edge portion will enter the thread 96 and thereby effect a separation of the major portion of the foremost carton blank from the stack in the magazine.

It will readily be appreciated that the foregoing construction completely eliminates inaccuracy in counting and separating one carton at a time from the supply in the magazine 60. Such inaccuracy is commonly due to warping of the carton blank so that the same no longer occupies a planar surface. The positive compression of the marginal edge portion of the foremost carton blank against the remaining blanks in the stack completely offsets any warpage effect and makes it possible to peel off even a badly warped carton blank for presentation to the rotary transfer turret 61.

The turret 61 is journaled for rotation upon an upstanding stationary shaft 99 carried by the frame 51 of the machine. The turret is formed with a depending skirted wall portion 100 having a pair of relatively large diametrically opposed openings therein to accommodate a pair of swingable gates 101, each of which is pivotally mounted on the turret body as at 102. In order to enable the gates 101 to carry the separated carton blanks from the magazine to the conveyor means, each gate is provided with a pair of vertically spaced vacuum cups 104. Each of the cups 104 is made of rubber or other resilient material and is secured to its associated gate by means of a hollow screw 105. Internally, the gates 101 are each formed with passageways 106 communicating with the vacuum cups, such passageways being in turn connected by flexible tubes 107 to an evacuated passageway 108 in a stationary head 109 fixed to the upper end of the shaft 99. The latter is of hollow construction and thus provides communication between the passageway 108 and the vacuum pump P via an evacuated line 110 (Figs. 1 and 8). For the protection of the pumps P, a filter F may be interposed in the line 110.

Fixed to the upper surface of the turret 61 for rotation therewith is a hardened valve disk 111 having suitable ports to effect evacuation of the cups 104 upon initial contact with a separated carton blank and to break the vacuum in such cups after they have been moved by the turret into carton releasing position. This makes it possible to utilize a continuously running vacuum pump, the performance of which can readily be ascertained by means of a vacuum gage 112 having a stem 112A which is threadedly attached to the stationary head 109.

For the purpose of obtaining the necessary outward radial swing of the gates 101 incident to engagement with the forwardmost carton in the magazine, suitable cam and follower means is utilized. Thus, each of the gates is formed with a depending stud 114 carrying a roller 115 adjacent its lower end. The roller 115 is arranged to ride in a cam track 116 cut in a stationary annular member 118 housed within the skirt 100 of the turret. The cam track 116 is, of course, formed with the necessary contour to produce an outward swing of each gate immediately prior to picking up a carton blank and to produce an inward swing of the gate as such blank is presented to the conveyor 54.

To insure proper registration between the gates 101 and the carton blanks separated from the magazine 60, the peeler wheel 92 is driven in timed relation to the turret 61 and at twice the speed of the latter. This is accomplished in the present instance by the use of a vertically disposed shaft 119 drivingly connected to the peeler wheel shaft 93 through a pair of identical bevel gears. Keyed to the shaft 119 for rotation therewith is a sprocket wheel 120 which is half the diameter of the sprocket wheel 121 fixed to the underside of the turret 61. The sprocket wheels 120 and 121 are connected by a common driving chain 122 which passes over an adjustable idler 124, the chain 122 being driven by means of a sprocket 125 rotatable with the conveyor 54 (Fig. 9).

Provision is made for erecting the folded carton blanks C as an incident to their transfer to the conveyor 54 by the turret 61. This is accomplished in part by the use of a stationary spreader 126 (Figs. 2 and 9) mounted adjacent the turret 61. The spreader 126 is fashioned with a curved guide 127 which follows the periphery of the turret 61 for an angular distance somewhat less than 90 degrees, eventually straightening out tangentially and terminating at the bottom flap latching device 55. At the opposite end of the guide 127, the latter forms an apex with a relatively short outwardly diverging guide 128. Accordingly, as the turret 61 carries a folded blank C into engagement with the spreader 126, the apex of the latter will enter between one of the inner bottom flaps A and the slitted outer bottom flap X (Fig. 5). As indicated in the drawings, the flap A has an arcuate vertical edge portion to facilitate entry of the spreader 126. The action of the spreader is also augmented by a slight radial inward motion of the gate 101 carrying the carton blank, such motion being produced by the contour of the cam track 116. Upon further rotation of the turret 61, the action of the spreader 126 forces the slitted flap X between the turret 61 and the guide 127, at the same time expanding the carton to a partially erected condition. Upon still further rotation of the turret 61, the carton blank is presented to an adjacent three-sided receptacle 130 which moves with the conveyor 54. Since the conveyor and the turret 61 rotate in timed relation to each other due to engagement with the driving chain 122, the partially erected carton blank is gradually pressed against the back wall of the receptacle 130. This pressure is augmented by an outward thrust of the gate 101 imparted by the cam track 116 shortly before the vacuum cups 104 release their hold, such action serving to square up the blank into a fully erected condition within the receptacle 130. At this point, the gate 101 recedes radially toward the turret 61 and the receptacle 130 takes full charge of the carton blank. In order to obtain lateral support for the outermost side of the blank C and thus retain the same in a fully erected or squared condition within the receptacle 130, a stationary horizontal side rail 129 is provided (Figs. 9 and 15), the leading end of such rail being supported upon an extension 64A of the magazine bracket 64. The rail 129 is located so as to lie between the vacuum cups 104, thus permitting contact between the former and the outermost side of the carton blank before the cups 104 release their hold.

*Conveyor*

Turning now to Figs. 9, 19 and 24, it will be perceived that the conveyor 54 is organized upon a continuous horizontal loop of chain 131 stretched between an idler sprocket wheel 132 and a driving sprocket wheel 133, being guided by means of channel members 134 which also provide intermediate support. For purposes of protection, the conveyor is covered by an overlying oblong hood 135 of sheet metal.

The idler sprocket 132 is bolted or otherwise rigidly fixed to a hollow spool-like member 136 journaled for rotation upon an upstanding stationary shaft 138 located in the general vicinity of the transfer turret 61. On the other hand, the driving sprocket 133, which has the same diameter as the idler 132, is pinned or keyed to an upstanding rotatable shaft 139 (Fig. 25). The latter is driven from the motor M through a variable speed transmission 140, a gear box 140A, and a suitable shaft coupling 141 (Figs. 1 and 2).

At spaced apart intervals, certain links in the conveyor chain 131 are provided with lateral extensions 142 which carry the three-sided carton receptacles 130. Preferably the spacing between successive ones of the extensions 142 is such that the receptacles 130 will lie 120 degrees apart as they pass around the sprocket wheels 132, 133. Since each of the latter in the present instance has twelve teeth, every fourth link in the chain 131 is arranged to carry a receptacle 130.

*Bottom flap closure means*

Two distinct arrangements are utilized for closing the bottom flaps of the carton prior to filling of the same. One such arrangement serves to close the inner pair of bottom flaps A, B, while the other, heretofore referred to by the numeral 55, serves to close and latch the outer or interlocking bottom flaps X, Y.

Considering first the means for closing the inner flaps A, B, it will be noted upon reference to Figs. 15, 16 and 17 that when the carton blank is finally positioned in the receptacle 130, the flap A occupies a leading position and the flap B a trailing position with respect to the direction in which the receptacle is moving. Consequently, before the carton has been moved very far, the lower edge of the leading flap A will be accosted by an inclined guide shoe 144 which commences to cam the flap A rearwardly and upwardly toward its closed position.

Provision is made for suddenly accelerating the trailing flap B and thereby moving the same into its fully closed position prior to closure of the flap A, such action taking place even after the shoe 144 has commenced the closure of the flap A. Furthermore, the foregoing acceleration of the flap B is achieved as an incident to the normal driving motion of the conveyor and without the use of parts moving independently thereof. To this end, the spool-like idler 136 of the conveyor is fashioned with an annular flange 145 (Figs. 15, 16) of substantially greater diameter than that of the conveyor idler sprocket 132. Mounted in circumferentially spaced relationship along the periphery of the annular portion 145 and spaced at intervals corresponding to the spacing between successive ones of the receptacles 130 are a plurality of upstanding tucking fingers 146. Each of the fingers 146 (Fig. 17) is formed with a curved knuckle portion 146A which in the present instance is defined by a reversely bent upper end portion.

With the foregoing construction, the linear velocity of any one of the fingers 146 at any particular instant will be substantially greater than the linear velocity of the conveyor chain 131 to which each of the receptacles 130 is attached. This is due to the difference in the diameters of the sprocket 132 and the flange 145, such difference making it possible for the fingers to move upon a greater radius than that upon which the chain 131 is driven. Consequently, if one of the fingers 146 should be located in trailing relationship to a receptacle 130, as indicated in Fig. 9, there will be a definite tendency for the finger to overtake the receptacle 130 as the latter departs tangentially from the sprocket 132 and moves at the same linear velocity as the conveyor chain 131. Turning once more to Fig. 17, this overtaking tendency is illustrated graphically, the linear advance of the receptacle and carton being indicated by the distance $d$ and the component of linear advance of the finger 146 during the same time interval being represented by the substantially greater distance D. By reason of the relationship just described, at about the time the shoe 144 initiates closing movement of the leading flap A, the knuckle 146A of the finger 146 cams hard against the trailing flap B at a point close to the hinge line of the flap. Since the finger 146 is moving faster relative to the carton C than the shoe 144, and further since the finger contacts the flap B near the hinge line whereas the shoe 144 contacts the flap A at its lower end, the flap B will be suddenly swung to a closed position substantially before closure of the flap A. The latter when closed, however, serves to retain the flap B in a closed position as the carton is moved into engagement with the outer bottom flap closure device 55. During this time, the outer bottom flaps X, Y hang in depending relation to the carton body and straddle the shoe 144.

With further motion of the conveyor driven receptacles 130, the erected carton is slid along the horizontal portion of the shoe 144 in such a manner that its interlocking flaps X, Y enter an inverted tunnel 148. The shoe 144 thereupon terminates and the weight of the carton is then borne by a stationary guide or plow member 149 disposed longitudinally of the tunnel 148 and in spaced apart relation with its side walls. The interior of the tunnel 148 is formed with an appropriate contour to define a plurality of stationary longitudinal guiding elements (Fig. 22) which gradually arch the flaps X, Y over the plow member 149 and latch them in a manner well known in the art. After the carton has completed its passage along the tunnel 148, all four bottom flaps are securely closed and the carton is then presented by the receptacle 130 to the filler head assembly 58.

*Filler head assembly*

As a preliminary to a description of this assembly, it will be helpful to discuss briefly the manipulation of the top flaps AA, BB, and XX, YY of the carton prior to entry of the latter under the filler head. Concurrently with the closure of the leading and trailing inner bottom flaps by the shoe 144 and the finger 146, the top flaps are brought into engagement with an overlying horizontally disposed shoe 150 having an upwardly inclined end portion 150A (Figs. 19 and 21). The edges of the portion 150A diverge laterally toward the horizontal portion of the shoe 150. As the carton moves toward the tunnel 148, the leading inner top flap AA is accosted by the inclined portion 150A of the shoe 150 and is flattened down rearwardly over the carton body. The other inner top flap BB is also urged downwardly by the portion 150A but assumes a trailing horizontal position with respect to the carton body. At the same time, the upstanding outer top flaps XX, YY cam into engagement with the diverging edges of the inclined portion 150A of the shoe and consequently assume a generally horizontal, outwardly extending position with respect to the carton body. Due to the marginal overlap of the shoe 150 over the end of the carton body, the top flaps are maintained in the condition just described until the carton is presented to the filler head assembly.

The filler head assembly 58 (Figs. 1, 19, 24 and 25) is organized about the upstanding power driven shaft 139 which drives the conveyor 54, as previously described. The assembly 58 comprises a stationary semi-circular bed 151 upon which the cartons are permitted to slide in an arcuate path, and adjustable double guide rail 151A being mounted around the periphery of the bed to preclude dislodgement of the cartons from the receptacle 130. The top surface of the bed 151 is relieved as at 152 to minimize sliding friction between itself and the cartons. Disposed in concentric and overlying relationship above the bed 151 are a top flap manipulating wheel 153 which is rotatable with the shaft 139 and a pair of annular members 154, 155, having coacting and abutting radial valve faces 156 and 157. The valve member 155 is non-rotatable and is arranged in overlying relationship with the member 154 which is rigidly secured to the driving shaft 139. For the purpose of adjusting the normal pressure between the valve faces 156 and 157, a manually adjustable unit 158 is mounted on the valve member 155, being adapted to engage the upstanding end of the drive shaft 139.

Provision is made for supplying ice cream to the filler head assembly simultaneously from one or more continuous freezers without interrupting the flow of any one of them. In the present instance, this is accomplished by connecting the discharge lines 159, 160 and 161 of three separate continuous freezers to a valve manifold 162 carried by the non-rotatable annular valve member 155. Each of the discharge lines 159, 160 and 161 is arranged to communicate separately with the valve member 155 via three short passageways 159A, 160A and 161A and suitably located ports 159B, 160B and 161B formed in a common rockable valve element 164 running longitudinally of the manifold 162. Each of the passages 159A, 160A and 161A terminates in a corresponding one of a series of relatively deep arcuate grooves 159C, 160C and 161C which are cut into the radial valve face 157 and extend for an angular distance of slightly less than 120 degress (Fig. 26).

In order to maintain a continuous rate of discharge in the lines 159, 160 and 161, it is necessary that they be in substantially constant communication with the procession of cartons passing through the filler head assembly 58. This is accomplished in the present instance by providing the rotatable valve member 154 with three sets of generally elliptical ports 159D, 160D, and 161D (Figs. 25, 26), each set being located on an axis displaced 120 degrees from that of the adjacent sets. As the valve member 154 rotates, these ports are adapted to register with their corresponding grooves 159C, 160C, 161C in the stationary valve member 155. By reason of the relative spacing and arcuate lengths of the ports 159D, 160D, 161D and the grooves 159C, 160C, 161C, one set of ports will always underlie the grooves. This relationship will become clearer upon reference to Fig. 26 which shows one set of ports about to register with the slots in the valve element 155 as the preceding set of ports passes out of registration with the former, thus maintaining a flow of ice cream to the cartons without interruption.

From the ports in the rotatable valve member 154 ice cream can be directed into an underlying carton by means of a funnel 165 (Figs. 24, 25) associated with each set of ports and dependably carried by the member 154. Each of the funnels 165 may be internally compartmented to distribute the various flavors of ice cream in any desired pattern within the carton being filled. In the present instance, however, each funnel 165 has a generally rectangular cross section with parallel partition walls defining three internal channels of identical size, 159E, 160E, 161E, respectively underlying the ports 159D, 160D and 161D.

As indicated earlier herein, the erected cartons are presented to the filler head assembly with three of the top flaps extending outward from the carton body but with one of the inner top flaps, namely AA, disposed in a semi-closed condition over the carton body. In order to open out the flap AA in preparation for the filling operation, the flap manipulating wheel 153 is formed with a series of angularly spaced spokes 166, each having an upturned leading edge portion. The relative phasing of the wheel 153 and the moving carton receptacles 130 is such that a spoke 166 will accost the inside surface of the flap AA as a carton slides onto the bed 151 of the filler head assembly. Due to the fact that the linear speed of the carton and receptacle is dictated by the diameter of the carrier driving sprocket 133, and the linear speed of any point on the spoke 166 is proportional to a substantially greater diameter than that of the sprocket 133, the spoke 166 will gain on the carton and open out the flap AA to a forwardly extending position. To maintain contact between the flap AA and the spoke 166 after the opening out of the former, the difference in speed is partially compensated for by slanting the spokes 166 rearwardly with respect to the direction of motion of the wheel 153.

Since the carton and the conveyor receptacle 130 are driven in timed relation to the rotating valve member 154, the carton will automatically register with an overlying funnel 165. Shortly before the filling operation takes place, the carton will be moved upwardly against the end of the funnel 165 by means of a slight cam rise 168 in the annular bed 151. Further rotation of these parts brings the ports in the valve member 154 into registration with the grooves of the valve member 155, resulting in a metered discharge of ice cream into the carton. Such discharge or flow continues for an angular distance of about 120 degrees and ceases for a particular carton when the set of ports 159D, 160D, 161D overlying the same passes out of registration with the grooves 159C, 160C, 161C.

Means is provided for automatically diverting the flow of ice cream from the supply lines 159, 160, 161 in the event that a vacant receptacle 130 enters the filler head assembly 58. Accordingly, the manifold 162 is formed with three diversion outlets 169, 170, 171 (Figs. 1 to 3) adapted to conduct the streams of ice cream discharged from the freezers into appropriate salvage containers (not shown). The diversion outlets are adapted to communicate with respective ones of the supply lines 159, 160, 161 via the passageways 159B, 160B, 161B, of the valve element or spool 164 upon rotation of the same through an angle sufficient to block off the passages 159A, 160A, 161A. In the present instance, this angle is in the neighborhood of 90 degrees. The spool 164 is formed with a relatively short external crank arm 172 to which appropriate rocking mechanism may be connected.

For the purpose of detecting the presence of a vacant carton receptacle 130 when it first passes under its associated filling funnel 165 and accordingly directing the flow of ice cream into the diversion outlets 169, 170, 171, without delay, a novel control arrangement is utilized. Referring more specifically to Figs. 24 and 28, it will be noted that there is journaled in the under portion of the bed 151 an upstanding rock shaft 174. Rigidly attached to the upper end of the shaft 174 for rotary movement therewith is a carton detector shoe 175 having a reversely bent upper end portion 176 adapted to project into the path of movement of the cartons along the bed 151. Rigidly fixed to the lower end of the shaft 174 and also adapted to rock therewith is a simple lever arm 178 adapted to actuate the plunger 179 of a control switch 180. The detector shoe 175 and the arm 178 are normally urged in a clockwise direction, as viewed in Fig. 24, by means of a small tension spring 181, thus tending to maintain the lever 178 out of contact with the switch plunger 179. Slidably supported below the bed 151 and pivotally connected at one end to the detector shoe 175 is a compression rod 182 adapted to move longitudinally in response to the rocking movement of the shoe 175. Pivotally secured to the underside of the bed 151 at a point almost diametrically opposite the rock shaft 175 is a second detector shoe 184 also formed with a reversely bent end portion 185 which projects into the carton path. The second shoe is biased in a clockwise direction by means of a torsion spring 186, the edge of the former having a notch 187 which abuttingly receives the adjacent end of the compression rod 182.

With the arrangement just described, if a carton is present in a receptacle 130 as it moves past the detector shoe 175, the latter will be cammed outwardly by the carton and will rock counterclockwise against the force of the spring 181, thus causing the lever arm 178 to depress the plunger 179 of the switch 180. During such action, the compression rod 182 will be drawn away from the edge of the second detector shoe 184 so as to become completely disengaged from the notch 187. Consequently, the second detector shoe 184 will swing clockwise under the action of its torsion spring 186 until the edge of this shoe engages the end of the rod 182 in its withdrawn position. Thus, as the carton moves out of engagement with the first detector shoe 175, the latter will be maintained in its outwardly swung position, at the same time retaining the switch plunger 179 in its depressed condition. This situation prevails until the carton which moved the shoe 175 has cammed against the second detector shoe 184 restoring the same to its original position wherein the end of the compression rod 182 engages the notch 187. When this occurs, however, the next succeeding receptacle 130 will be approaching the first detector shoe 175, and, if such receptacle contains a carton, the return of the shoe 175 will be precluded and the switch plunger will remain depressed. If, however, this receptacle should be empty, the first detector shoe 175 would be permitted to swing clockwise so as to disengage the lever 178 from the switch plunger 179 and thereby allow the latter to return to its original extended condition. It will therefore be appreciated that as long as successive carton receptacles 130 are filled, the plunger of the switch 180 will be depressed when the first receptacle passes the shoe 175 and will remain in that condition until there is a vacancy in one of the receptacles.

Figure 4:
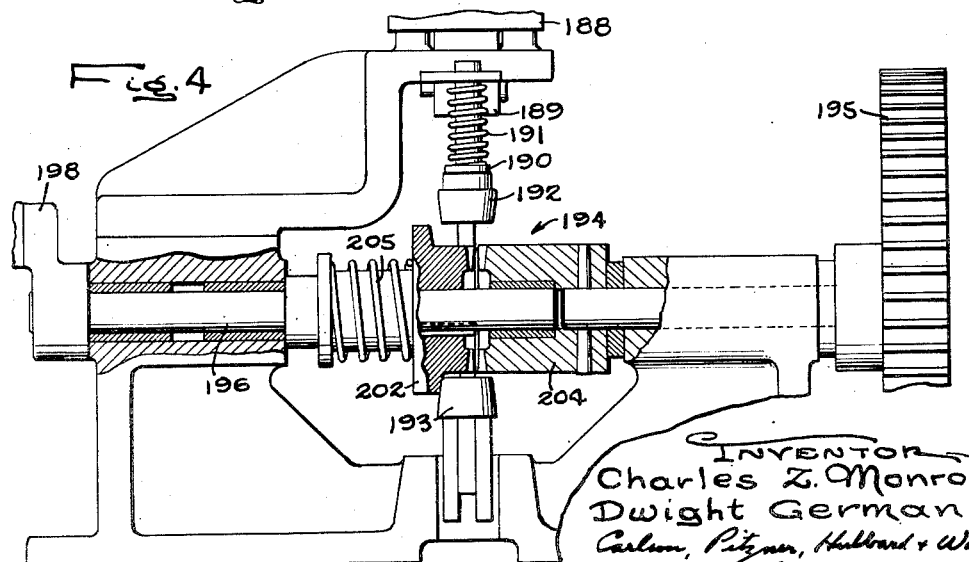
Fig. 4 is an enlarged fragmentary vertical sectional view taken through a clutch mechanism in Fig. 3 and in the plane of the line 4—4.

Appropriate provision is made for rocking the valve spool 164 to divert the flow of ice cream in response to the actuation of the switch 180. Preferably, this is accomplished by the use of a solenoid controlled clutch arrangement such as that shown in Figs. 1 and 4. In this instance, the depression of the switch plunger 179 serves to energize a clutch operating solenoid 188. The latter has a movable core 189 rigidly connected to a yoke member 190 and is normally biased in a downwardly extended position due to the action of gravity and a spring 191. The yoke 190 is formed with a pair of diametrically opposed conical elements 192, 193, which are adapted to effect the engagement and disengagement of a radial jaw clutch 194. This clutch governs the application of power from a gear 195, driven by the variable speed transmission to the crank arm 172 of the rockable valve spool 164. The transmission of power from the clutch 194 is accomplished by means of a driven shaft 196 having a crank 198 rotatable therewith, together with an appropriate linkage comprising the connecting rods 199, 200 and 201. In the foregoing arrangement, the solenoid 188, when energized, will maintain the yoke 190 in a raised position with the conical element 193 abutting a cam rise on one of the clutch jaws 202 and thereby precluding engagement of the same with a mating jaw 204. Upon deenergizing of the solenoid 188 due to a vacancy in one of the receptacles 130, the yoke 190 and the conical element 193 will descend, permitting the clutch jaws to engage under the action of an axial clutch spring 205. This rotates the crank arm 198 through an arc of about 180 degrees until the other conical element 192 contacts the cam rise of the jaw member 202 and disengages the clutch. The resulting movement of the crank arm 198 serves, of course, to rock the spool 164 through an angle of about 90 degrees and into its diverting position. These conditions will prevail until the solenoid 188 is again energized, whereupon the resulting lifting of the yoke 190 will permit the clutch 194 to drive the crank 198 through another arc of 180 degrees and thus restore the rockable valve spool 164 to its filling position.

As indicated earlier herein, the normal pressure between the valve faces 156, 157 of the annular valve members 154, 155 can be adjusted by means of the device 158. The latter includes a spider member 205 having a large vertical bore adapted to threadedly receive the depending tubular portion 206 of a hand wheel 208 (Figs. 25 and 31). Disposed within the tubular portion 206 and retained by means of a keeper plate 299 is a helical compression spring 210 which abuttingly engages an upper washer 211 and a lower washer 212. The washer 212, in turn, abuts against the inner race of a roller thrust bearing 214. As shown in Figs. 29 and 30, the opening in the upper washer 211 is formed with two opposed parallel sides and two arcuate sides, being of appropriate cross section to slide over the upstanding end of the drive shaft 139 and register with a pair of diametrically opposed flats 213 running longitudinally thereof. In the vicinity of its tip, the shaft 139 is also fashioned with a pair of transversely disposed arcuate grooves 215 each intersecting a flat 213 and an adjacent arcuate portion of the shaft surface. If the device 158 in the condition shown in Fig. 31 be positioned on the non-rotatable valve member 155 with the spider 205 secured against rotation as by means of dowels 216, the upper washer 211 will register with the grooves 215 due to the relative proportioning of the parts. Upon turning of the hand wheel 208 in the proper direction to compress the spring 210, the upper washer will also turn so that the parallel sides of its opening enter the grooves 215 in a sort of bayonet lock effect. Further turning of the hand wheel causes its underside to separate from the upper end surface of the spider 205, the thrust of the spring 210 against the upper collar 211 being resisted by the upper walls of the grooves 215. This produces an equal and opposite downward reaction which is transmitted to the valve member 155 by the tubular body 206 and the spider 205. Such reaction can be varied between relatively wide limits by different adjustments of the hand wheel, thereby permitting an optimum seal to be obtained between the valve faces 156, 157, with a minimum of friction. Once the hand wheel has put the spring under compression, the hand wheel will separate from the upper washer 211 as indicated in Fig. 25, leaving both washers together with the spring 210 rotatable with the shaft 139 although adjustable by non-rotatable means.

To remove the device 158, the foregoing process has merely to be reversed, whereupon the device can be lifted off as a unit. After removal of this device, the non-rotatable valve member 155 can easily be swung upwardly about a hinge support for cleaning purposes.

*Top flap closure and carton discharge*

After a carton has been filled, it continues along a semi-circular path on the bed 151 with its top flaps projecting outwardly and possibly upwardly from the carton body. For the purpose of closing these flaps in proper sequence, an arrangement closely similar to that already described in connection with the bottom flaps is utilized. Accordingly, the flap manipulating wheel 153 (Figs. 19 and 21) is provided with a second set of angularly spaced spokes alternating with the spokes 166. Each spoke in the second set is fashioned with an upturned, forwardly projecting end portion 218 which is adapted to engage the trailing inner top flap BB. Due to the fact that the finger 218 moves upon a greater radius than that of the conveyor sprocket 133 which moves the carton receptacle 130, the finger will have a component of linear velocity greater than that of the carton. Consequently, the finger 218 will gain on the carton and accelerate the flap BB into closed position as the carton is leaving the filler head assembly 58. During this time, the leading inner top flap AA is accosted by the upwardly sloping end portion 219 of a stationary guide shoe 220 overlying the linear path of carton travel. This closes the flap AA over the flap BB but leaves the outer or interlocking top flaps XX, YY, in upstanding relationship on either side of the shoe 220.

With further movement of the conveyor and receptacle 130, the filled carton is moved under a tunnel 148A in the closure device 56 (Figs. 19, 21 and 23). The tunnel 148A is the inverted counterpart of the tunnel 148 used for interlocking the outer bottom flaps prior to filling and includes a stationary longitudinal plow 149A similar to the plow 149. The tunnel 148A serves to latch and fold down the interlocking top flaps XX, YY, in a well known manner, thereby completing the packaging operation.

As the closed cartons leave the tunnel 148A, each is gradually stripped from its associated receptacle 130 by a fixed lateral guide 221 (Figs. 2 and 19) which positions the carton for entry into the discharge chute 59. Each carton is given a parting shove along the chute 59 by the longer side of its receptacle 130. With steady operation of the machine 50, a procession of cartons forms within the chute 59 with the result that each newly added carton displaces a prior one at the discharge end of the chute.

Speed control

Figure 3:
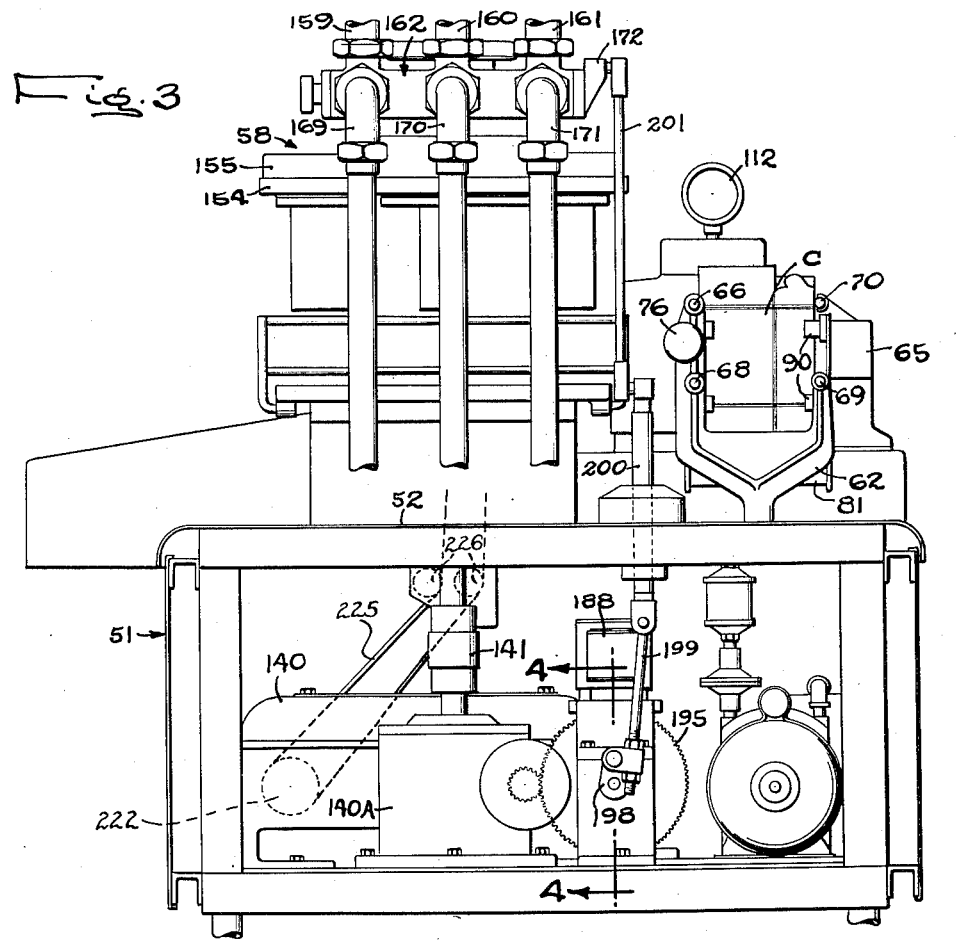
Fig. 3 is an end elevation of the machine shown in Fig. 1, taken from the end adjacent the filler head assembly.

For the purpose of accommodating the machine 50 to various freezer discharge rates, a manual speed control is utilized in operative association with the variable speed transmission 140 which drives the entire machine. In the present instance, the transmission 140 is of the variable diameter split pulley type and has an adjusting wheel 222 projecting from its housing (Fig. 3). In order to enable an operator to manipulate the wheel 222 conveniently, a calibrated hand adjusting wheel 224 (Figs. 1, 2, 19, 20, 21) is journaled on an upstanding extension of the machine frame adjacent the filler head assembly. The hand wheel 224 is connected to the wheel 222 by means of a chain 225 which runs over a pair of spaced apart guide wheels 226 mounted on the machine frame.

Synopsis of operation

Since the operation of each of the various mechanisms included within the machine has already been discussed in detail, a lengthy summary seems unnecessary at this point. It is believed, however, that a brief review from the standpoint of overall machine operation might be helpful here. Thus carton blanks in collapsed or knock-down form are inserted in a stack in the magazine 60. One blank at a time is positively separated from the stack by the peeler wheel 92 and presented to the swingable gate of the transfer turret 61, being retained thereon by the vacuum cups 104. As the turret rotates, the carton blank is partially erected by contact between certain of its bottom flaps and the spreader 126. With further rotation of the turret 61, the blank is presented to an adjacent three-sided receptacle 130 carried by the conveyor 54, the blank being pressed into a fully erected position as it enters the receptacle. After closure of the inner bottom flaps A, B, by the moving finger 146 and the stationary shoe 144, the carton is slid along over the tunnel 148 wherein the outer bottom flaps are closed and latched. The carton then enters the filler head assembly 58 where it is filled through one of the funnels 165. As the carton leaves the assembly 58, the inner top flaps AA, BB, are closed by the moving finger 218 and the end 219 of the shoe 220. Further travel of the carton moves it under a second tunnel 148A similar to the tunnel 148 and thus the final closure and interlocking of the outer top flaps XX, YY is completed. Following this, the filled carton is stripped from the receptacle 130 and directed into the discharge chute 59 by the lateral guide 221.

We claim:

1. A machine for packaging fluent material delivered thereto in a continuous flow and comprising, in combination, a power driven conveyor having carton receptacles mounted at spaced apart intervals thereon and movable therewith, means for supplying cartons to said receptacles, a filler head assembly disposed in overlying relationship with a portion of said conveyor, rotary valve means for producing a continuous metered discharge of fluent material into a procession of cartons moved under said filler head assembly by said receptacles, control means adapted to detect a vacancy in one of said receptacles, a flow diversion valve communicating with said filler head assembly, said valve being responsive to said control means and adapted to promptly divert the flow of material from said rotary valve means without interrupting such flow, and means for carrying away the material diverted by said valve.

2. A machine for packaging fluent material delivered thereto in a continuous flow from one or more sources simultaneously, said machine comprising the combination of conveyor means having spaced apart carton receptacles movable therewith, means for supplying cartons to said receptacles, a filler head assembly disposed in overlying relationship with a portion of said conveyor means, a diversion valve mounted on said filler head assembly, said valve having a filling and a diverting position, rotary valve means for producing a continuous metered discharge of fluent material into the cartons moved thereunder by said receptacles, a deflectable shoe member projecting into the path of said cartons and adapted to detect a vacancy in any one of said receptacles, electromagnetic control means responsive to the deflection of said shoe member, and power transmitting means arranged to shift said diversion valve between its filling position and its diverting position in response to a signal from said electromagnetic control means.

3. In a packaging machine of the character set forth wherein a conveyor moves a procession of cartons under a filler head assembly to receive metered discharges of fluent material, the combination of a drive shaft having an upstanding end portion fashioned with diametrically opposed pairs of flats interrupted by transverse grooves, a rotatable valve member drivingly mounted on said shaft and having a ported valve face, a non-rotatable valve member surrounding said shaft and having a ported valve face disposed in rotational abutment with the valve face of said rotatable member, and a detachable adjusting unit interposed between said shaft and said non-rotatable member to alter the normal pressure between said valve faces, said unit including a washer engageable with the transverse grooves in said shaft, a thrust bearing, and an adjustable compression spring disposed between said washer and said thrust bearing.

4. A machine for packaging fluent material delivered thereto in a continuous flow, comprising in combination, a power-driven conveyor having container receptacles mounted at spaced apart intervals thereon and movable therewith, means for supplying containers to said receptacles, a filler head for successively filling the containers on the conveyor, means for detecting a vacancy in one of said receptacles, a diversion outlet conduit, and a valve responsive to the last mentioned means for diverting the flow of the fluent material from said filler head to said diversion outlet conduit so that there will be no substantial interruption in the flow of the fluent material.

5. A machine for packaging fluent material delivered thereto in a continuous flow, comprising in combination, a power-driven conveyor having container receptacles mounted at spaced apart intervals thereon and movable therewith, means for supplying containers to said receptacles, first means for successively filling the containers on the conveyor with the fluent material, second means for detecting vacancies in said receptacles, third means responsive to said second means for diverting the fluent material from the first means, and means for carrying off the diverted material so that there will be no substantial interruption in the continuous flow of the material.

6. In a packaging machine of the type wherein a conveyor moves a procession of containers under a filler head assembly to receive metered discharges of fluent material, the combination comprising a drive shaft having an upstanding end portion, a rotatable valve member drivingly mounted on said shaft and having a ported valve face, a nonrotatable valve member surrounding said shaft and having a ported valve face disposed in rotational abutment with the valve face of said rotatable member, a compression spring, a thrust bearing mounted on said nonrotatable member for supporting said spring, means for detachably connecting the upper end of the spring to the shaft, and means for moving the thrust bearing vertically to adjust the spring pressure between said valve faces.

CHARLES Z. MONROE.
DWIGHT GERMAN.

References Cited in the file of this patent

UNITED STATES PATENTS

| Number | Name | Date |
|---|---|---|
| 909,582 | Glass | Jan. 12, 1909 |
| 1,300,409 | Johnson et al. | Apr. 15, 1919 |
| 1,640,482 | Crumbaugh et al. | Aug. 30, 1927 |
| 1,745,616 | Hansen | Feb. 4, 1930 |
| 1,799,755 | Loughridge | Apr. 7, 1931 |
| 1,855,132 | Jones et al. | Apr. 19, 1932 |
| 1,954,908 | Zimniak | Apr. 17, 1934 |
| 1,987,581 | Schneider | Jan. 8, 1935 |
| 1,989,286 | Milmoe | Jan. 29, 1935 |
| 2,184,117 | Fechheimer | Dec. 19, 1939 |
| 2,320,581 | First et al. | June 1, 1943 |
| 2,322,228 | Staebler | June 22, 1943 |
| 2,325,774 | Hohl | Aug. 3, 1943 |
| 2,434,952 | Nordquist | Jan. 27, 1948 |